United States Patent [19]

McCown et al.

[11] Patent Number: 5,067,099
[45] Date of Patent: Nov. 19, 1991

[54] METHODS AND APPARATUS FOR MONITORING SYSTEM PERFORMANCE

[75] Inventors: Patricia M. McCown, Cresskill; Timothy J. Conway, Highland Park; Karl M. Jessen, Bayonne, all of N.J.

[73] Assignee: Allied-Signal Inc., Morris Township, Morris County, N.J.

[21] Appl. No.: 335,464

[22] Filed: Apr. 10, 1989

Related U.S. Application Data

[63] Continuation-in-part of Ser. No. 266,722, Nov. 3, 1988.

[51] Int. Cl.$^5$ ............................................. G06F 15/74
[52] U.S. Cl. ..................................... 364/550; 371/26; 364/150
[58] Field of Search ..................... 364/550, 513, 150; 371/26, 25.1

[56] References Cited

U.S. PATENT DOCUMENTS

| | | | |
|---|---|---|---|
| 4,632,802 | 12/1986 | Herbst et al. | 376/216 |
| 4,642,782 | 2/1987 | Kemper et al. | 364/550 |
| 4,644,479 | 2/1987 | Kemper et al. | 364/550 |
| 4,649,515 | 3/1987 | Thompson et al. | 364/900 |
| 4,658,370 | 4/1987 | Erman et al. | 364/513 |
| 4,704,695 | 11/1987 | Kimura et al. | 364/513 |
| 4,752,890 | 6/1988 | Natharajan et al. | 364/513 |
| 4,754,409 | 6/1988 | Ashford et al. | 364/513 |
| 4,763,277 | 8/1988 | Ashford et al. | 364/513 |
| 4,766,595 | 8/1988 | Gollomp | 371/23 |
| 4,841,456 | 6/1989 | Hogan, Jr. et al. | 364/550 |
| 4,847,795 | 7/1989 | Baker et al. | 364/579 |

FOREIGN PATENT DOCUMENTS

| | | |
|---|---|---|
| 58-142455 | 8/1983 | Japan . |
| 59-79170 | 5/1984 | Japan . |
| 59-206713 | 11/1984 | Japan . |
| 60-91413 | 5/1985 | Japan . |

OTHER PUBLICATIONS

P. M. McCown et al., "A Diagnostic Expert System Using Heuristic and Causal Reasoning", pp. 371-376, Proc. IEEE Int'l., Autotestcon '87, San Francisco, 3-5 Nov. '87.

P. M. Bursch et al., "A PC Based Expert Diagnostic Tool", pp. 73-77, Proc. IEEE Int'l Autotestcon '87, San Francisco, 3-5 Nov. '87.

T. F. Thompson et al., "Meld: An Implementation of a Meta-Level Architecture For Process Diagnosis", pp. 321-330, IEEE 1st Conference on Artificial Intelligence Applications '84, Silver Spring, MD.

deKleer, "Choices Without Backtracking", Proceedings of the American Association of Artificial Intelligence, 1984 Conference, pp. 79-85.

Davis, "Diagnostic Reasoning Based on Structure and Behavior", in Qualitative Reasoning about Physical Systems at pp. 347-410, The MIT Press, 1985.

Kuipers, "The Limits of Qualitative Stimulation", Proceedings of the International Joint Conference on Artificial Intelligence, IJCAI 85.

(List continued on next page.)

Primary Examiner—Thomas G. Black
Attorney, Agent, or Firm—Christopher N. Malvone; Howard G. Massung; Robert A. Walsh

[57] ABSTRACT

Method and apparatus for performing system monitoring and diagnostics is disclosed. In performing system monitoring, data is acquired from the system under test and compared to an event model. The event model comprises a database having event records which predefine events which can occur. Each event record includes a state vector dependency which lists the events which must occur prior to the pre-defined event occurring and one or more critical parameters defining the data which must occur during the system's performance for the event to have occurred. Event recognition is performed by comparing each event record to acquired operational data and to events already recognized. Associated with each event record in the database is an intelligent data acquisition action which defines an action to be taken as a result of the event record being recognized. These actions can modify the performance of the system being monitored or the acquisition of data. Additionally, the results of the event recognition step can be further analyzed in a computer.

41 Claims, 14 Drawing Sheets

OTHER PUBLICATIONS

Pan et al., "P.I.E.S.: An Engineer's Do-It-Yourself Knowledge System For Interpretation of Parametric Test Data", Proceedings of the American Association of Artificial Intelligence Conference, pp. 836–843, 1986.

Forbus, "Interpreting Measurements of Physical Systems", Proceedings of the American Association of Artificial Intelligence Conference, pp. 113–117, 1986.

Fink et al., "The Integrated Diagnostic Model—Towards a Second Generation Diagnostic Expert", pp. 188–197, Proceedings of the Air Force Workshop On Artificial Intelligence Applications For Integrated Diagnostics, Jul. 1986.

Chu, "Approaches to Automatic Fault Diagnosis: A Critical Evaluation", Report #SETR-86-001 of the Software Engineering Technical Series prepared by the Allied-Signal Aerospace Co.-Bendix Test Systems Division, Jul. 1986.

Abbott et al., "Faultfinder: A Diagnostic Expert System with Graceful Degradation for Onboard Aircraft Applications", 14th International Symposiumon Aircraft Integrated Monitoring Systems, 1987.

Kolodner, "Extending Problem Solver Capabilities Through Case-Based Inference", Proceedings of the 4th Annual International Machine Learning Workshop, pp. 21–30, 1987.

Kamal et al., "Event-Based Learning for Monitoring Rotating Machinery", 2nd Proceedings of Applications of Artificial Intelligence in Engineering Conference, pp. 1–20, Aug. 1987.

Holtzblatt, "Diagnosing Multiple Failures Using Knowledge of Component States", Proceedings of the CAIA 1988, pp. 134–143.

Abbott, "Robust Operative Diagnosis As Problem Solving In a Hypothesis Space", 1988 Proceedings of the American Association of Artificial Intelligence, pp. 369–374.

Koton, "Reasoning About Evidence in Causal Explanations", Proceedings Case-Based Reasoning Workshop Sponsored by DARPA, pp. 260–270, May 1988.

Rose, "*Thinking Machine—An Electronic Clone of a Skilled Engineer is Very Hard to Create*", in the Wall Street Journal, Aug. 12, 1988.

METHODS AND APPARATUS FOR MONITORING SYSTEM PERFORMANCE

RELATED CASES

This application is a continuation-in-part of copending U.S. Ser. No. 266,722, filed Nov. 3, 1988.

FIELD OF THE INVENTION

The invention relates to methods and apparatus for analyzing and monitoring the performance of a system. More specifically, it relates to a hybrid knowledge representation of a system and methods for analyzing the representation to allow faster and improved monitoring of the system's operation.

BACKGROUND OF THE INVENTION

As the complexity of man-made systems increases, the complexity of the tasks involved in maintaining such systems also increases. The maintenance tasks include, by way of example only, fault diagnosis, fault location, performance monitoring, performance optimization and repair. These tasks are typically performed by an expert technician, by analytical diagnostic tools or by a combination thereof.

Many diagnostic tools are known for use in maintenance tasks, however, they are all limited in one or more respects. Early diagnostic tools utilized snapshot monitoring wherein an instantaneous picture of the system under test is developed. Another test concept used in early diagnostic tools was stimulus-response testing wherein test equipment is used to develop appropriate stimulus waveforms and the response of the system test is analyzed. In fact, many system in use today are still maintained and tested by diagnostic tools using these techniques.

Diagnostic tools using steady state and stimulus-response testing techniques, however, are unable to use the full spectrum of information available about the system under test. In particular, these tools make no use of knowledge concerning the design or the prior maintenance history of the system under test. These systems, therefore, do not provide reliable fault diagnosis of systems. Furthermore, such systems have severely limited ability to reason about results obtained during testing or monitoring.

As a result of the limited reasoning ability, expert systems have been incorporated into various diagnostic tools. In a common form, the expert system uses a surface knowledge representation of the system under test to analyze and reason about potential faults in the system. Surface knowledge representations typically associate a set of symptoms with a set of faults which association is frequently presented in the form of a fault tree. Surface knowledge representations also frequently take the form of a set of rules of the If-Then form. Data or information for the surface knowledge representation is usually obtained from the expert technician or the system designer.

These systems have had limited successes in simple systems where maintenance experts have accumulated enough experience in maintaining the system to provide accurate rules for most of the possible system faults. In cases where the system under test is somewhat complex, however, it is often very difficult to embody the expert's experience in a set of rules to drive the expert system, even where the expert has had sufficient experience with the complex system. See, for example, "The Thinking Machine—An Electronic Clone of a Skilled Engineer is Very Hard To Create", in the Aug. 12, 1988 issue of the Wall Street Journal on page 1, wherein the efforts of the Southern California Edison Co. to develop an expert system to diagnose faults in one of their dams is described. The expert system was to be based on a set of rules which embodied the knowledge of a civil engineer having two decades of related experience. After a significant investment in time and money and after narrowing the scope of the project, limited diagnostic success was achieved, however, the diagnostic tool was not put into regular use.

Expert systems based on surface knowledge representations, therefore, require an exhaustive set of a priori rules which accurately encompass the spectrum of the possible faults of the system under test to be effective. Furthermore, such expert systems perform poorly when fault conditions occur which are beyond the surface knowledge heuristic rule base since there is no knowledge base upon which further reasoning can occur. Expert systems based on surface knowledge representations, therefore, offer limited reasoning capabilities.

Expert systems have also incorporated deep knowledge representations of systems under test, wherein the functional and structural qualities of a system's components are qualitatively modeled to show connectivity and behavioral relationships. This approach enables a diagnostic tool to deal with imprecise behavioral and structural characteristics of a system, such as dynamic changes in connectivity, which can not be addressed in other approaches, thereby offering potential for greater flexibility in reasoning. Such qualitative models can represent the operation of a system without exhaustive a priori enumeration of all possible failure models, as required in surface knowledge approaches.

Diagnostic tools based on such qualitative models can, however, easily become computationally unwieldy since the number of computations required to use the qualitative model is proportional to the connectivity of the system under test. The connectivity of a system increases as a combinatorial function of the number of components in the system, so that models which represent complex systems having many functions and components become computationally untractable.

Various combinations of the previously discussed diagnostic tools have been suggested. In Report No. SETR-86-001 of the Software Engineering Technical Report Series prepared by the Allied-Signal Aerospace Company, a two layer expert system using a surface knowledge representation embodying heuristic rules developed by system maintenance experts and a deep knowledge representation embodying component behavior and system connectivity is suggested. It is also suggested to use reliability statistics as an adjunct to the expert system. The suggested two layer expert system would first diagnose a system based on the heuristic rules of the surface knowledge representation. The deep knowledge representation is referenced only when a failure mode which is outside the failures embodied in the rule base is encountered. The suggested two layer expert system, therefore, does not provide an integrated diagnostic tool. Rather, in most cases such a system is dependent on a heuristic surface knowledge representation and the required exhaustive enumeration of a priori rules, which can be difficult to develop. Causal reasoning with a deep knowledge representation would be referenced only when heuristic reasoning with a surface knowledge representation fails. The results obtained with such a diagnostic tool would only be marginally improved since the knowledge representations are not truly integrated. Furthermore, the suggested diagnostic tool fails to solve the problem of the computationally untractable qualitative models in the deep knowledge representation when such models are referred to.

A diagnostic system that combines a surface knowledge expert system with a deep knowledge expert system was also suggested in "The Integrated Diagnostic Model-Towards a Second Generation Diagnostic Expert System", published in July 1986 in the Proceedings of the Air Force Workshop on Artificially Intelligence Applications for Integrated Diagnostics at pages 188 to 197. This diagnostic tool separates the two knowledge representations until a decision is to be made. At the time of decision, an executor process arbitrates between the two expert systems to make a decision. This tool, therefore, fails to integrate the two types of knowledge and has problems similar to the suggested two layer expert system discussed above.

A diagnostic tool which provides an integrated knowledge representation of a system, combining a variety of knowledge representations of a system as well as other system information is needed. Such a diagnostic tool should provide flexible decisions similar to those provided by expert systems utilizing deep knowledge representations, but should also provide quick and efficient decisions as well as improved diagnostic decisions.

As previously mentioned, another aspect of maintaining a system is monitoring and optimizing its performance. In system performance monitoring, the goal is to detect any abnormality in performance and affect the appropriate action. The abnormality is typically reflected in the signals produced by the operation of the system which are collected by the monitoring system.

The importance of performance monitoring is indicated in the design of systems, many of which incorporate "onboard" monitoring capabilities, allowing a system to monitor its own activities. The onboard monitoring systems typically respond to suspected abnormalities by either issuing a warning, shutting the system down, or causing predetermined data to be recorded in a nonvolatile memory or other recording devices.

The effectiveness of monitoring systems, whether on board or not, in achieving their goal of detecting abnormalities and responding appropriately, is dependent upon the speed at which the evaluation of the collected system performance data can be made, the quality of the evaluation made, the specificity of the abnormality identified, and the quality and quantity of the collected performance data stored for future diagnostic of analytical use. Presently, the effectiveness of monitoring systems and the immediate usefulness of the performance data collected from the system is limited in the above-mentioned areas. Monitoring systems are further limited by the computing power distributed at the system level and by the limited diagnostic analysis performed on the performance data during system use.

As a result, monitoring systems and methods that evaluate collected performance data quicker and more completely, control data acquisition for so as to improve the quality and quantity of data stored for later diagnostic use and have improved diagnostic and analytic capabilities, are needed.

SUMMARY OF THE INVENTION

The present invention provides method and apparatus for monitoring a system's performance. The performance of the system is modeled with a database having many event records. Each of the event records pre-defines an event that can occur during the operation of the system by any events which must occur prior to the occurrence of the pre-defined event and with one or more parameter conditions which must occur during the performance of the system for the pre-defined event to occur. During the operation of the system operational data is acquired from the system by a data acquisition system. Event recognition is performed by comparing the event records from the database model to the acquired operational data. Specifically, starting at the first event record, the acquired operational data is compared to those events which must occur prior to the event pre-defined by the first event record. If the events so defining the event record are found or if there are no such events, then the parameter conditions found in the first event record are compared to the acquired operational data. If a match is found when comparing the parameter conditions, then the event defined by the first event record is recognized.

The comparison steps above can be repeated for every event record. Alternatively, the comparison steps can be limited to those event records which define events that can logically occur during the period of operation of the system in which the operational data was collected.

At any time during the monitoring of the system, those event records defining events which have been recognized can be used to analyze the system's performance. The analysis may be done by a connected computer system or it may be embedded in the database model. As an example, each event record may include a list of actions to be performed in the event the event defined by the event record is recognized.

The analysis of the recognized events to determine the systems performance can result in modifying a performance parameter in the system, modifying the data acquisition system or warning an operator of the system of a certain type of condition.

DESCRIPTION OF THE PREFERRED EMBODIMENT

The diagnostic tool in the preferred embodiment of the present invention uses a hybrid knowledge representation of a system which integrates causal and heuristic representations of the system to improve diagnostic and monitoring capabilities and to obtain more flexible reasoning in the analysis of the data from the system. The causal relationships of the systems are embedded in an event based representation of the system and in a structural model of the system. The event based representation provides a temporal definition of system performance from which pre-defined events, which can occur during system operation, are recognized. The structural model defines the physical connectivity, hierarchy and static character of the system on a component by component basis. The heuristic relationships of the system are embedded in a rule based symptom-fault model and in a rule based failure model. These models embody the knowledge of the expert technician and/or the system designed and are very similar to known heuristic systems.

Figure 1:
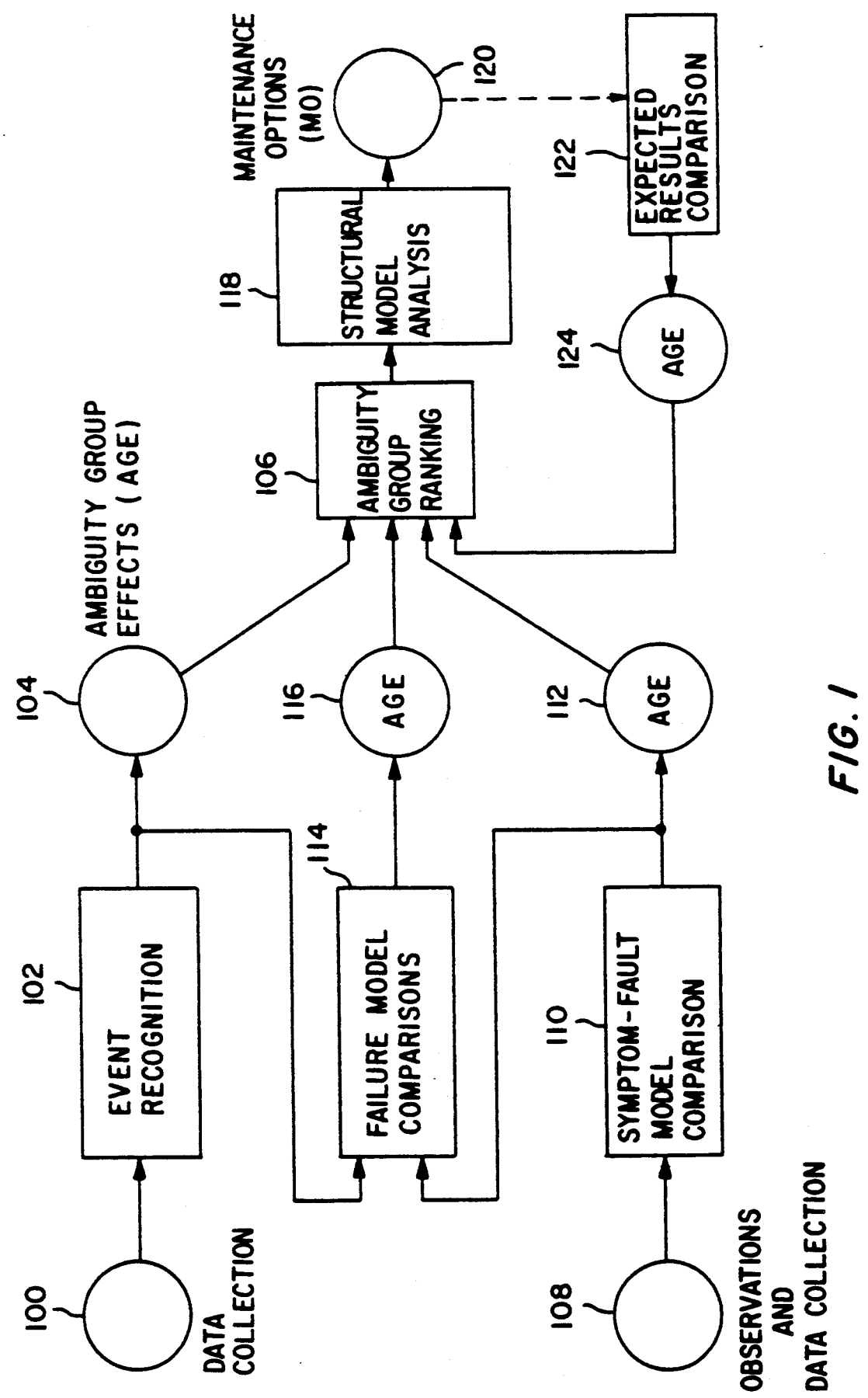
FIG. 1 illustrates the steps performed to analyze faults in a system.

FIG. 1 illustrates the steps performed by the diagnostic tool in the analysis of the hybrid knowledge representation in accordance with a preferred embodiment of the present invention. In step 100, a plurality of data samples are collected from the system under test during its operation. In step 102, the collected data is compared to the event based representation of the system to perform event recognition. In this step, events which are pre-defined by the event based representation and that occur during the operation of the system under test are recognized. Each event defined by the event based representation is associated with a plurality of ambiguity group effects, each of which specifies one or more components from the system under test which are either operationally suspect or absolved from suspicion as a result of the event being recognized and a ranking effect for each component. After analysis of the recognized events and events related to the recognized events, the appropriate ambiguity group effects from each recognized event are applied in step 104.

In step 106, the ambiguity group effects are applied to an ambiguity group, which is a ranked list of all system components. Initially, all the components in the ambiguity group have the same arbitrary ranking, say 0. Step 106 causes the components in the ambiguity group to be re-ranked according to the ranking effect from the ambiguity group effects output in step 104, so as to be ordered according to their probability of failure.

The heuristic relationships specified in a symptom-fault model of the system and a failure model of the system are integrated with the steps 100 to 106, in accordance with a preferred embodiment of the invention. In step 108, the operation of the system under test is observed and data is collected during the observation. In step 110, the observed data is compared to a symptom-fault model which comprises a plurality of symptom-fault relationships. The comparison determines the subset of symptom-fault relationships from the symptom-fault model which are matched by the observed data and, therefore, exhibited by the operation of the system under test. Each of the plurality of symptom-fault relationships in the model is associated with a set of ambiguity group effects each of which specifies one or more components and a ranking effect for each component, as before. In step 112, the set of ambiguity group effects associated with each of the symptom-fault relationships determined in step 110 are applied to the ambiguity group in step 106, so the components specified by the ambiguity group in step 106, so the components specified by the ambiguity group in step 106, so the components specified by the ambiguity group effect are re-ranked according to the specified ranking effect.

In step 114, a failure model of the system under test, comprising a plurality of rules, is analyzed. Outputs from the event recognition performed in step 102, from the symptom-fault analysis performed in step 110 or from any other source are compared to event criteria from the failure model which specify patterns that correspond to the rules in the model. Each pattern has associated with it a set of ambiguity group effects, as before. In step 116, the set of ambiguity group effects corresponding to recognized patterns from the failure model are output. In step 106, the output set of ambiguity group effects are applied to the ambiguity group, as previously described.

In step 118, a structural model of the system under test that specifies component connectivity is analyzed, starting with the components which are ranked at the top of the ambiguity group and, therefore, most suspect. In step 120, maintenance options are output as a result of the analysis of the structural model. The maintenance options specify possible operations which can be performed on a component by a technician. In step 122, the results obtained from performing the specified maintenance options can be compared to the expected results of performing those options. Each expected result is associated with ambiguity group effects, as before. Appropriate ambiguity group effects are selected for output in step 124 for use in step 106, where the specified components are re-ranked in the ambiguity group according to the ranking effect.

Figure 2:
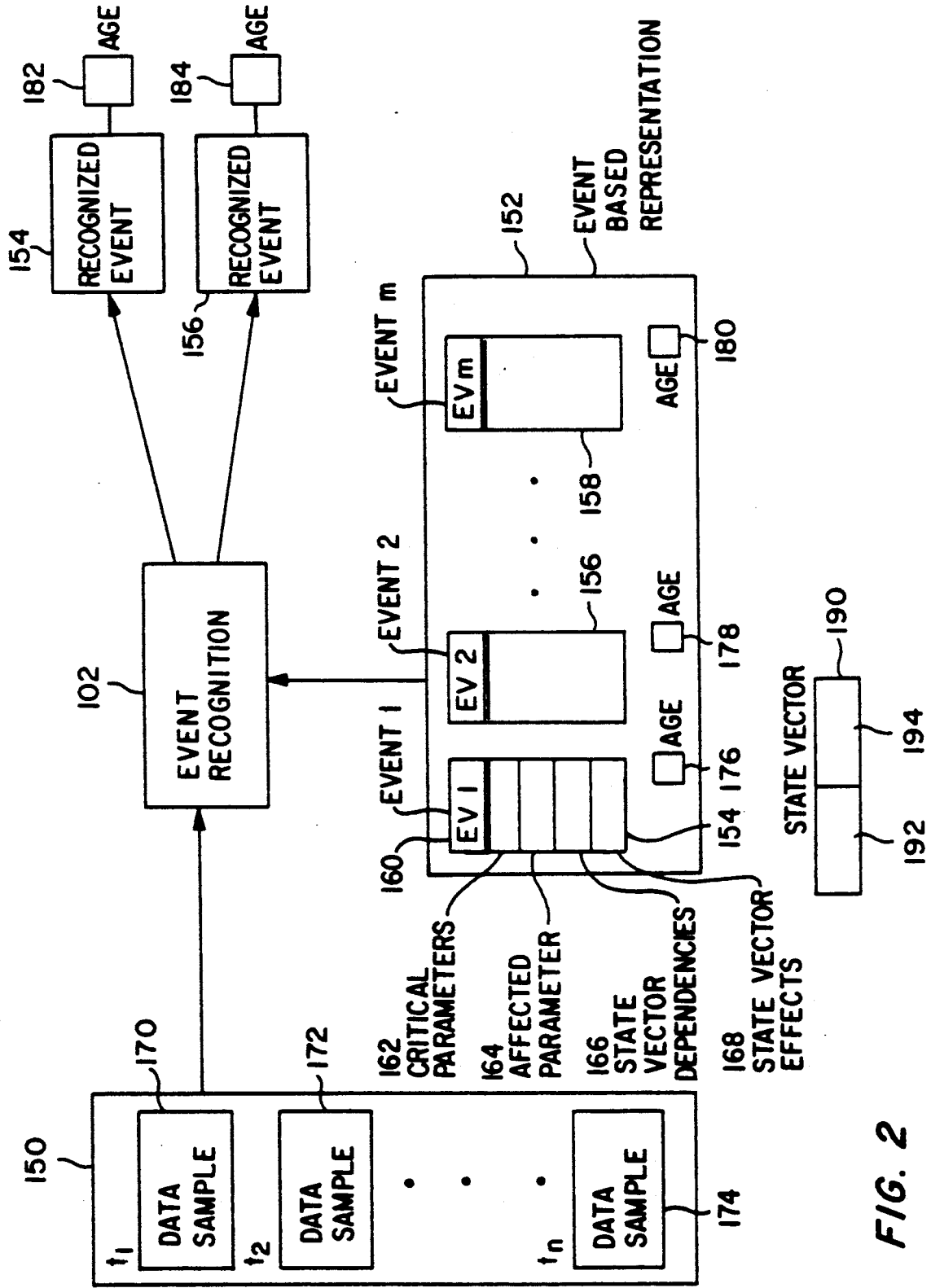
FIG. 2 illustrates the use of an event based representation of the system under test.
Figure 3:
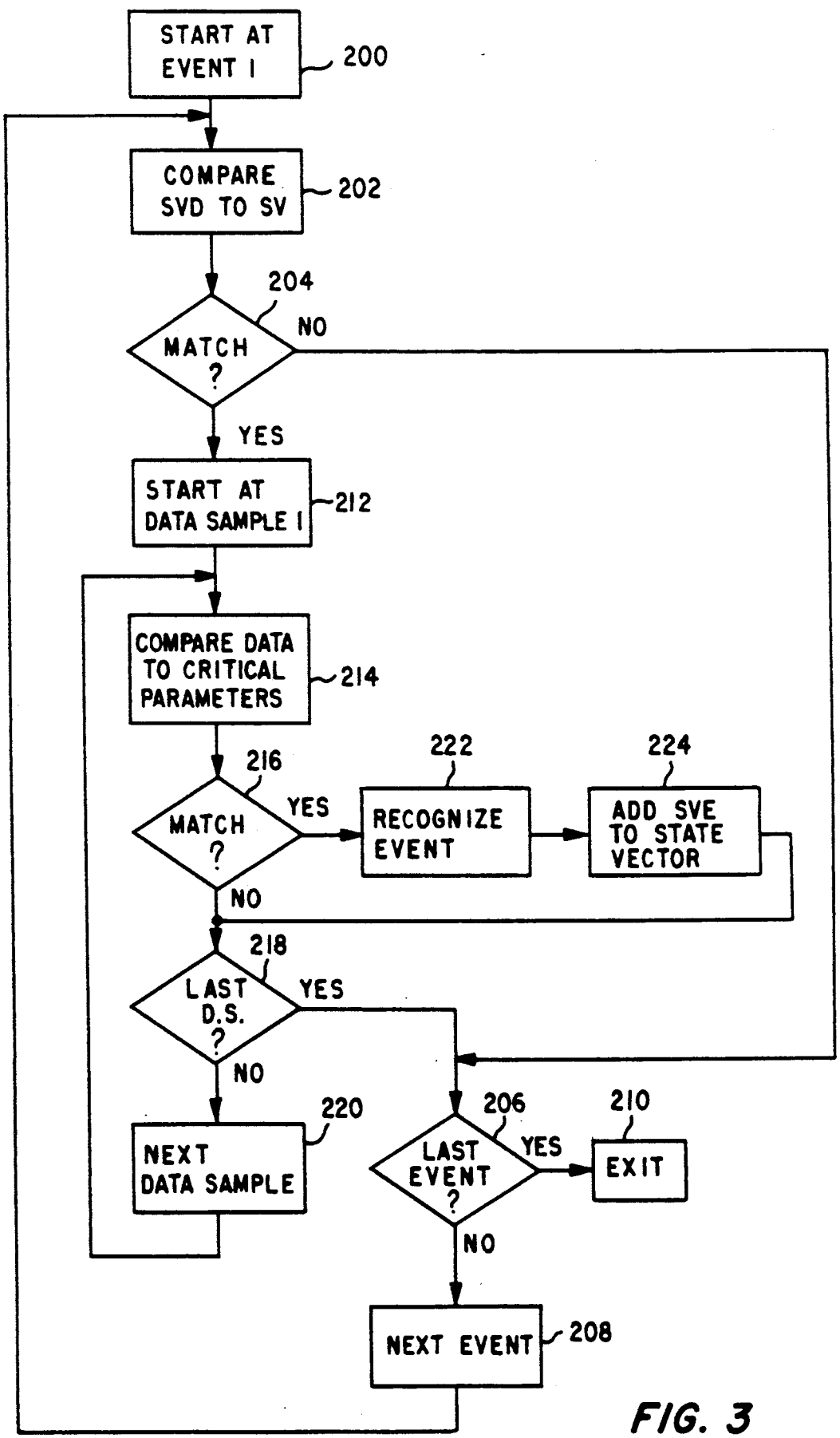
FIG. 3 illustrates the step of comparing collected data to the event based representation to perform event recognition.
Figure 4:
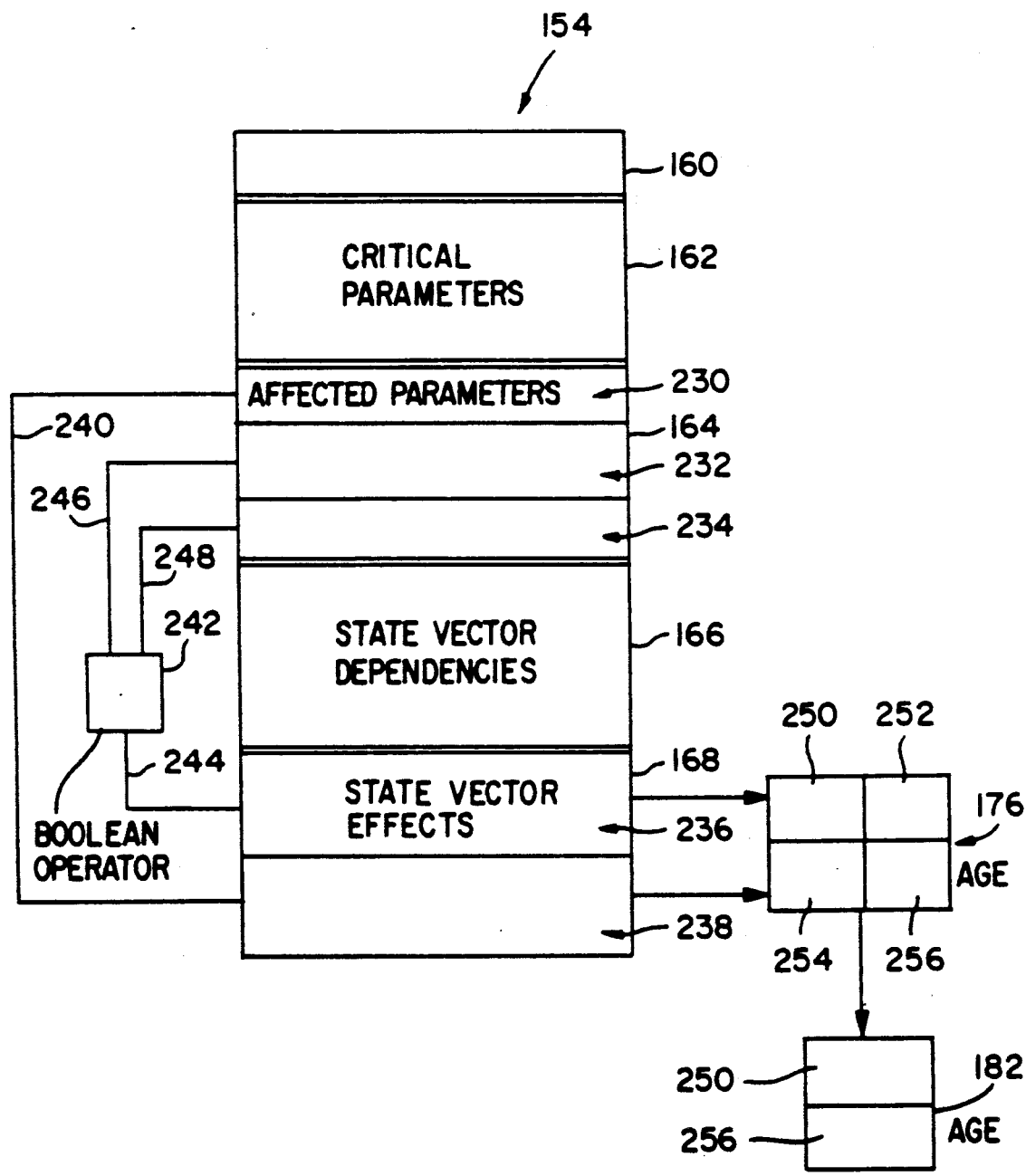
FIG. 4 illustrates the analysis of a recognized event to select an ambiguity group effect for output.

A more detailed description of the steps shown in FIG. 1 is now provided. FIGS. 2 through 4 illustrate the steps associated with the use of the event based representation of the system and its effect on the ambiguity group.

In step 102, event recognition is performed by comparing the collected data 150 to the event based representation 152 of the system, as shown in FIG. 2. The event based representation 152 provides a temporal definition of the performance of the system under test. It comprises a plurality of event records 154, 156 and 158 stored in a database, each of which defines an event which can occur during the operation of the system. The level of representation is determined by the inherent testability of the system under test. It is only necessary to represent the system to a level at which the system operation can be measured. Each event record 154 to 158 is characterized by the name, phase and function of the event at location 160 and is represented by a number of parameters. These parameters include one or more critical parameters at location 162 by which the event is recognized, affected parameters at location 164 which should be affected by the occurrence of the event, state vector dependencies at location 166 which define preconditions that must exist in the system for the event to be recognized and state vector effects at location 168.

The data 150 collected from the system in step 100 comprises a plurality of data samples 170, 172 and 174. This data 150 represents the operational characteristics of the system from which the defined events of the event based representation 152 are recognized in step 102. These samples are time tagged so that sample 170 is associated with time $t_1$, sample 172 is associated with time $t_2$ and so on. Further, calculations can be performed on the collected data 150, and included in the data samples 170 to 174 for use in the event recognition process of step 102 or the pattern recognition process of step 114.

The data 150 can be collected by any known data acquisition technique. In a preferred embodiment, the data 150 is collected from the system and time-tagged by a programmable, intelligent acquisition module, such as product number AVME-9110, manufactured by Acromag.

This module affords a plurality of sampling rates as well as a plurality of channels which are programmably selectable. It includes memory to store the plurality of records 154 to 158 of the event based representation 152, memory to store the collected data 150 and an on board microprocessor which enables the necessary calculations from the data 150 and the subsequent event recognition of step 102. By using a programmable, intelligent data acquisition system having sufficient memory to store the event based representation 152 and the data 150, real time event recognition in step 102 is obtainable. A single Acromag acquisition module should be sufficient for most systems, however, if greater acquisition capability is needed additional modules or a different data acquisition module with greater capacity can be utilized.

The event recognition process of step 102 will now be described with reference to FIGS. 2 and 3. FIG. 3 illustrates the event recognition steps of step 102 in greater detail. In step 200, the first event 154 in the event based representation 152 is selected. In step 202, the state vector dependencies at location 166 in event record 154, which define the preconditions that must exist in the system under test for the defined event to have occurred, are compared to a history of events that occurred during operation of the system under test. The history is embodied in a state vector 190 which is a list of the state vector effects from location 168 of the events recognized in step 102. The state vector 190 must be updated every time an event is recognized. At the start of diagnostics, the state vector 190 is either empty or loaded with initial values.

In step 204, the state vector dependencies for the first event record 154 and the state vector 190 are analyzed to determine if the preconditions specified by the state vector dependencies have occurred. If the preconditions are not found, the event 154 is not recognized. In step 206, the event based representation 152 is examined to see if there are more events. If there are, the next event is retrieved in step 208. If there are no more events, the analysis is ended in step 210.

If, in step 204, a match is found between the state vector dependency of event record 154 and the state vector 190, then the event recognition analysis for event record 154 continues. In step 212, the first data sample 170 from the collected data 150 is selected. In step 214, the data sample 170 is compared to the critical parameters found at location 164 is in the event record 154. In step 216, it is determined whether there is a match between the critical parameters and the data sample. If there is no match, the collected data 150 is examined in step 218 to see if the last data sample from collected data 150 was used. If the last data sample was used, then step 206 is repeated to see if every event record has been used. If there are more data samples, they are retrieved in step 220.

If, in step 216, match between the critical parameters of event record 154 and the data sample 170 is found, then the event defined by event record 154 is declared recognized in step 222. In step 224, the state vector at location 168 of event record 154 is added to the state vector 190 at location 192. Then step 218 is repeated to see if there are more data samples to be used.

In this way, all data samples 170 to 174 from collected data 150 are compared to the critical parameters from every event record 154 to 158 from the event based representation 152. FIG. 2 illustrates the recognition of event 1 defined by event record 154 and event 2 defined by event record 156 by this process and output from step 102. The state vector 190, therefore, consists of a first set of state vector effects 192 from event 1 and a second set of state vector effects 194 from event 2.

The matching required by step 102 is simple one-to one matching. The implementation of such matching is well known in the art.

As was previously mentioned, each event record 154, 156 and 158 is associated with a plurality of ambiguity group effects 176, 178 and 180, respectively. Each ambiguity effect specifies one or more components which are either operationally suspect or absolved as a result of the analysis and a ranking effect for each of the specified components. FIG. 2 illustrates events 154 and 156 as having been recognized in step 102. A subset of ambiguity group effects 182 selected from the set of ambiguity group effects 176 is output with event record 154. Similarly, a subset of ambiguity group effects 184 selected from ambiguity effects 178 is output with event record 156.

FIG. 4 illustrates the analysis of a recognized event 154 to select the subset of ambiguity group effects 182 from the set of ambiguity group effects 176 which are to be output from step 102. The event record 154 has a plurality of affected parameters 230, 232 and 234 at location 164 and a plurality of state vector effects 236 and 238 at location 168. The affected parameters 230 to 234 define the states of parameters of the system under test which should have been affected in some way be the occurrence of the event during operation of the system. The actual state of the affected parameters can be checked by reference to the collected data 150. The state vector effects 236 to 238 define the effects of the recognized event defined by event record 154 which should have occurred in the system. The state vector effects at locations 236 and 238 are related to the affected parameters at locations 230 to 236 or to the critical parameters at locations 162 either directly of by Boolean operators. Referring to FIG. 4, it is seen that state vector effect 238 is directly related to affected parameter 230 by pointer 240. The occurrence of the effect specified by the state vector effect 238 can thereby be confirmed by reference back to the event record 154 or other data samples as needed and by comparing that data to the components state defined by the affected parameters 230. If the component state defined by the affected parameter 238 is confirmed. If it is not, then the state vector effect 238 is not confirmed.

FIG. 4 also shows state vector effect 236 related to two affected parameters 232 and 234 by a Boolean operator 242 through pointers 244, 246 and 248. Any state vector effect can be so defined if appropriate. The Boolean operator 242 can define any logical combination of affected parameters. State vector effect 236 is confirmed, therefore, by referencing data from collected data 150 and comparing it to affected parameters 232 and 234 to see if the Boolean operator 242 is satisfied.

Each state vector effect is associated with sets of ambiguity group effects, one set for use if the effect is confirmed by reference to the appropriate affected parameters and another set for use if the effect is not confirmed by the reference. State vector effect 236 is, therefore, associated with a first set of ambiguity group effects 250 to be used if the effect 236 is confirmed and a second set of ambiguity group effects 252 to be used if the effect is not confirmed. State vector effect 238 is similarly associated with a first set of parameters 254 to be used if the effect is confirmed and a second set of parameters 256 to be used if the effect is not confirmed. The combination of ambiguity group effects 250 to 256 comprise the ambiguity group effects 176 associated with event record 154. In step 104, the appropriate subsets of ambiguity group effects for each recognized event is selected based on the analysis of the affected parameters and the state vector effects as described. Referring to FIG. 4, assume the effect specified by the state vector effect 236 is confirmed by reference to affected parameters 232 and 234, so that the first set of ambiguity group effects 250 is selected for use with output 182. Also assume the effect specified by the state vector effect 238 is not confirmed by reference to affected parameter 230, so that the second set of parameters 256 associated with state vector effect 238 is selected for use with output 182.

Each ambiguity group effect 250 to 256 specifies what components are suspect or absolved as a result of the event being recognized and a rank for each component according to the level of suspicion for the component.

In addition to analyzing events recognized from the event based representation 152 to select appropriate ambiguity group effects, events related to the recognized events can also be analyzed to select ambiguity group effects. For example, if the system under test normally progresses through a sequence of four events but only three were recognized, the fourth unrecognized event might also be used to select ambiguity group effects.

Figure 5:
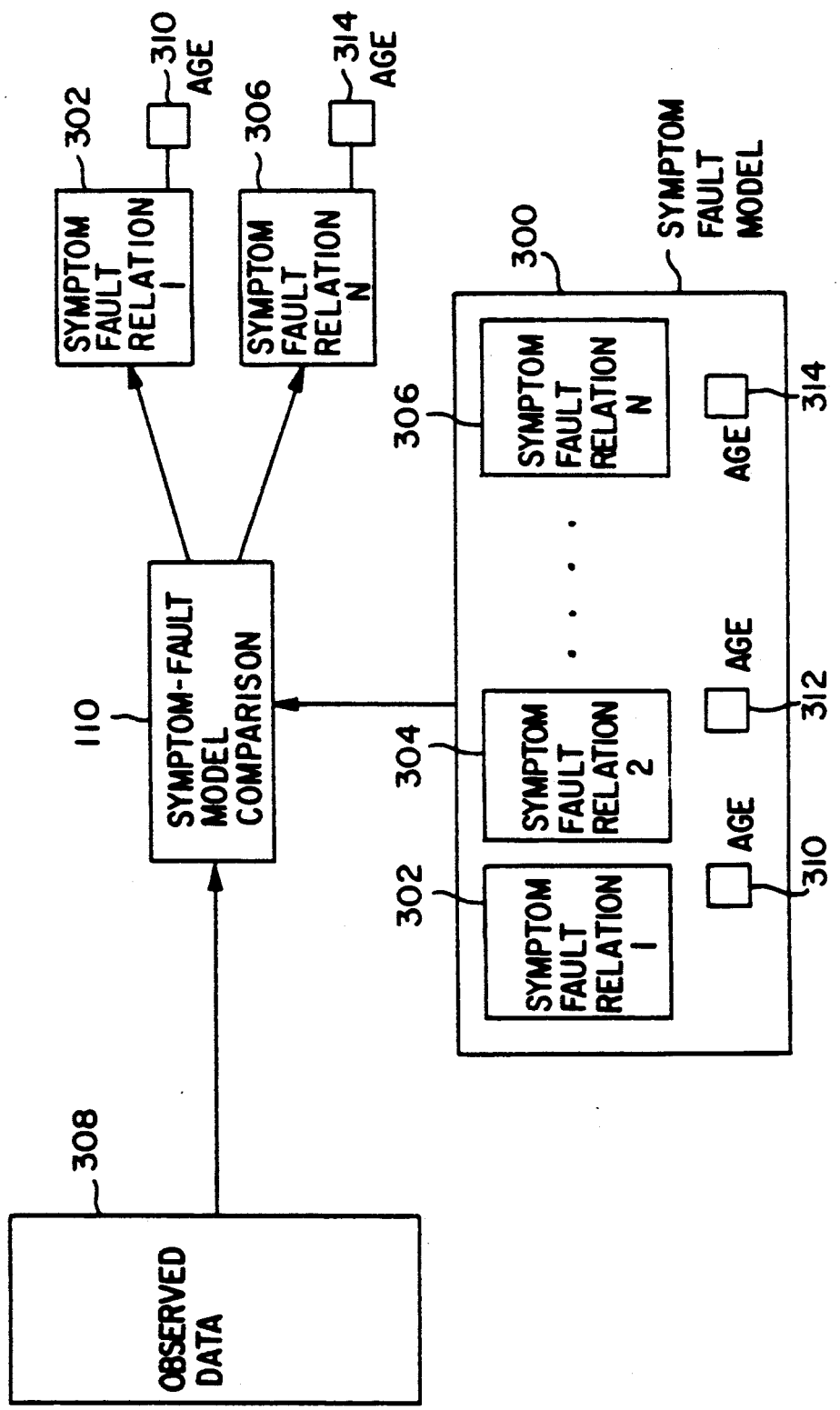
FIG. 5 illustrates the use of a symptom-fault model in accordance with the invention.
Figure 6:
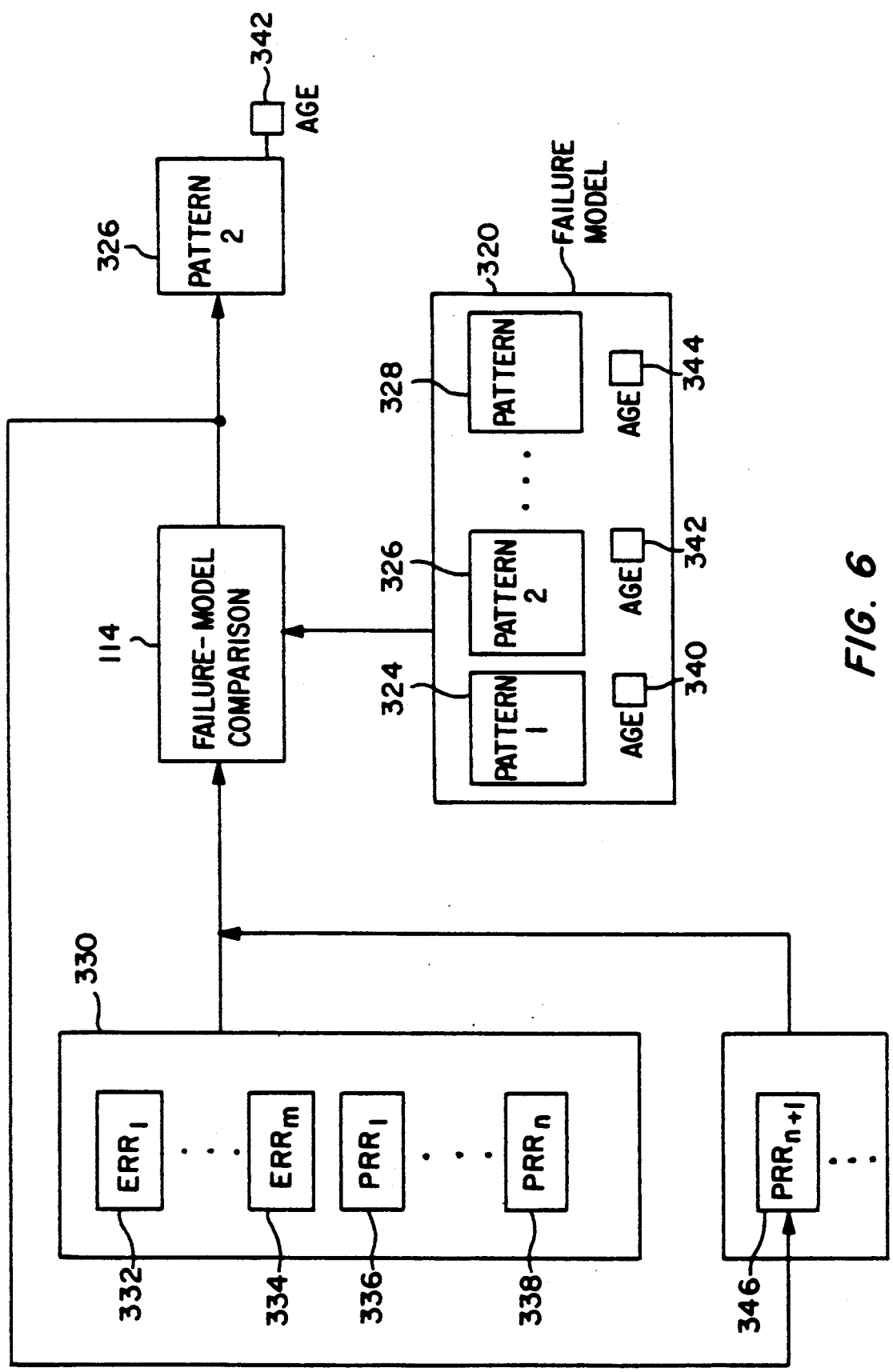
FIG. 6 illustrates the use of a failure model in accordance with the invention.

Referring to FIG. 1, the heuristic rules embodied in a symptom-fault model and a failure model are integrated into the diagnostic tool in a steps 108 to 112 and in steps 114 to 116, respectively. FIGS. 5 and 6 illustrate the these steps in greater detail.

FIG. 5 illustrates the use of symptom-fault model 300 in step 110. The symptom-fault model 300 in step 110. The symptom-fault model 300 comprises a plurality of symptom-fault relationships 302, 304 and 306 which apply to the system under test. The symptom-fault relationships 302 to 306 are stored in a database. Such symptom-fault models containing a set of heuristic rules descriptive of the symptom-fault relationships of the system under test are well know. The data for these models is collected and derived from technical orders, repair manuals, technician observations, logistics data or any other source of system failure data.

To use the symptom-fault model 300, the operation of the system under test is observed in step 108. The observed data 308 is formatted to allow comparison with each symptom-fault relationship 302 to 306. In step 110, all of the observed data 308 is compared to each one of the symptom-fault model 300 to find those relationships which match the observed data and, therefore, are applicable to the operation of the system under test.

Each symptom-fault relationship 302, 304 and 306 is associated with a set of ambiguity group effects 310, 312 and 314, respectively, each of which specify one or more components and a ranking effect for each of the specified components. Where the comparison made in step 110 specifies the applicability of any of the symptom-fault relationships 302 to 306 are determined 19 be applicable to the system under test in step 110, so that the associated sets of ambiguity group effects 310 and 314 are output.

FIG. 6 illustrates the use of the failure model 320 in step 114 in greater detail. The failure model 320 comprises a plurality of heuristic rules which define potential failures in the system under test. Failure models are well known and are typically presented in the form of If-Then rules. The failure model 320 of the present invention comprises a plurality of patterns which are associated with each rule. The failure model 320, therefore, comprises a plurality of patterns 324, 326 and 328.

The inputs 330 used for comparison against the patterns of the failure model 320 are derived from several sources. Events recognized in step 102 are utilized to form Event Recognition Records 332 and 334. Each Event Recognition Record 332 and 324 also has a pointer that specifies the location of the data sample 170 to 174 from which the event was recognized. In this way, the data samples 170 to 174 are also available for comparison to the patterns of the failure model 320. Similarly, the symptom-fault relationships which were found to exist in step 110 are used to form pattern recognition records 336 to 338.

The patterns 324 to 328 of the failure model 320 are defined by logical combinations of event criteria which can correspond to the event recognition records 336 to 338, or to any other inputs 330 which may be applicable. In step 114, all of the inputs 330 are compared to each pattern 324 to 328 in the failure model 320. The matching required to perform step 114 is significantly more difficult than the matching required to perform event recognition in step 102. A "many to many" matching strategy is used in the preferred embodiment because each recognition record 332 to 338 can have many component parts that must be compared to a pattern 324 to 328 which may be defined by many event criteria. In the preferred embodiment, CLIPS, an artificial intelligence language, is used to implement a matching algorithm based on the Rate Network. Other languages which can be used include OPS5 and SOAR.

Each pattern 324, 326 and 328 in the failure model 320 is associated with a set of ambiguity group effects 340, 342 and 344, respectively. When the matching performed in step 114 determines that a pattern exists, it is output with its associated set of ambiguity group effects. In FIG. 6, for example, pattern 326 has been recognized so that the associated set of ambiguity group effects 342 is output in step 116.

When the pattern 326 is recognized in step 114, a new pattern recognition record 346 is developed and added to the input set 330. The matching performed in step 114 continues until all of the pattern recognition records, including those developed during the matching, have been compared to the failure model 320.

Figure 7:
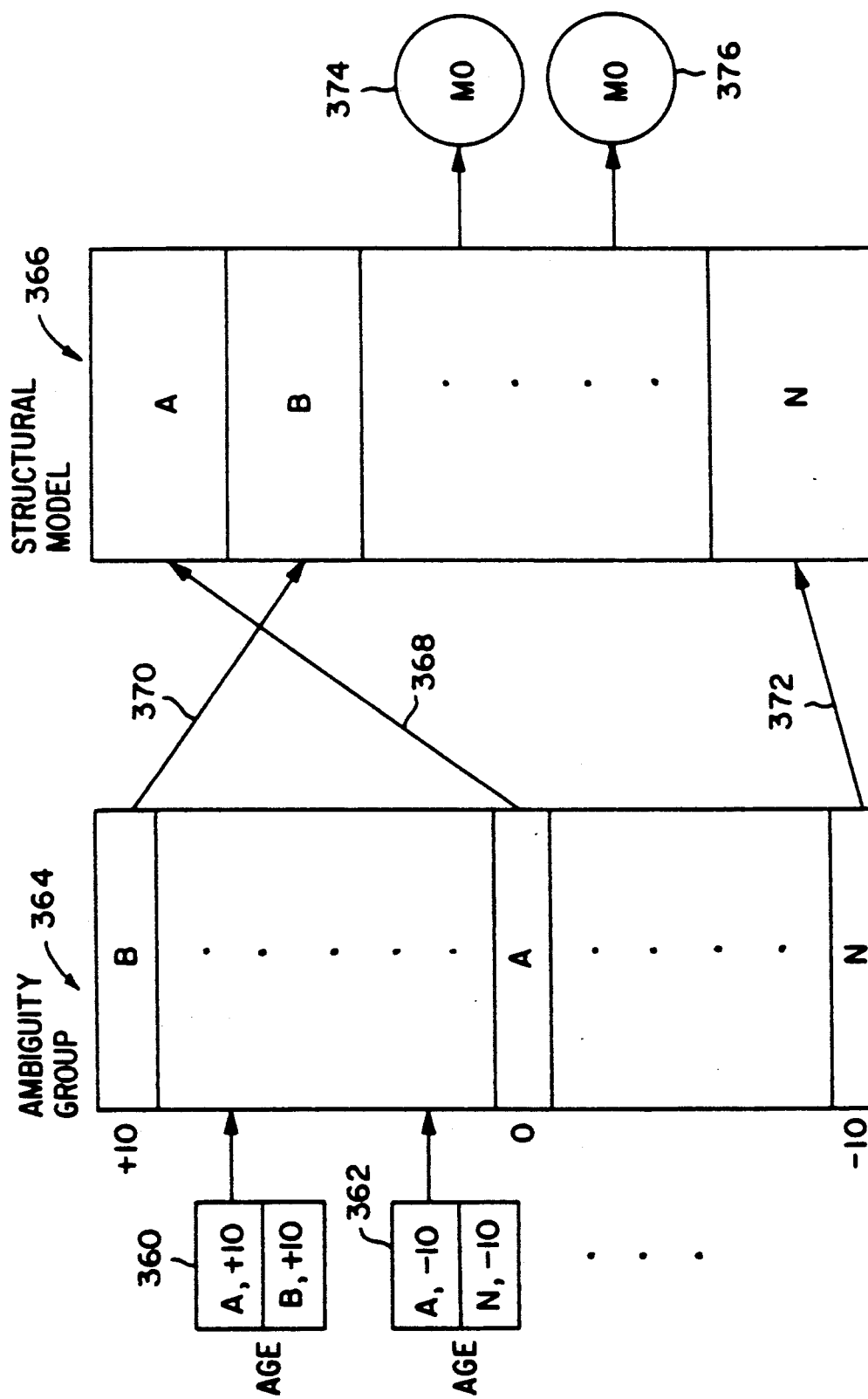
FIG. 7 illustrates the effect of ambiguity group effects on the ambiguity group and ambiguity group's pointers to a structural model of the system under test.

FIG. 7 illustrates two sets of ambiguity group effects 360 and 362, an ambiguity group 364 and a structural model 366 of the system under test. The ambiguity group 364 comprises a ranked listing of system components as specified by the sets of ambiguity group effects 360 and 362 and pointers 368, 370 and 372 which are associated with each component. Initially, all components in the ambiguity group 364 are equally ranked at an arbitrary number, say 0. As each model or representation of the system under test is analyzed and re-analyzed, the ambiguity group effects 360 and 362 are generated, each of which specify one or more system components which are to be re-ranked and the ranking effect to be applied to the component in its ambiguity group ranking. Ambiguity group effects 360 and 362 each specify two system components to be re-ranked in the ambiguity group 364 and a ranking effect for each of the two specified components. The ranking effects are arbitrary numbers which only have meanings relative to other ranking effects. The ranking effect for a given ambiguity group effect should therefore, be chosen to reflect the accuracy of the analysis.

In step 106, each set of ambiguity group effects 360 and 362 are applied to the ambiguity group 364. Initially, all components A, B and N in the arbitrary group have a rank of 0. Ambiguity group effect 360 specifies that system components A and B are suspect, and should be re-ranked with a ranking effect of +10 applied. Ambiguity group effect 362 specifies that system components A and N are not suspected. The ranking effect, −10, is applied to lower the ranking of component A to 0, as indicated. Component N is re-ranked with a ranking effect of −10 applied. The ambiguity group effects 360 and 362 can be generated by any of the analysis steps previously discussed or by any other model of the system under test.

Each component A, B and N in the ambiguity group 364 is associated with pointers 368, 370 and 372, respectively, which point to the locations of the components in the structural model 366. After the processing of all sets of ambiguity group effects 360 and 362, the ambiguity group 364 ranks each component in the list according to its likelihood of failure. The structural model 366 can not be analyzed be referencing the system components at the top of the ambiguity group 364, such as component B, and locating the component in the structural model 366 by means of the associated pointer, in this case pointer 370.

The structural model 366 is similar to known structural models in that is specifies the system's component connectivity and hierarchy. Previous diagnostic tools have had difficulty utilizing such structural models of complex systems, because of the large number of computations needed to analyze the structural model. The diagnostic tool of the present invention makes the use of such models more computationally attractive than other analytical tools by pointing to the location in the structural model component with the greatest likelihood of failure, thereby avoiding unnecessary and lengthy computations.

In addition to the specification of system characteristics such as connectivity and hierarchy, the structural model 366 in accordance with a preferred embodiment of this invention includes a qualitative description of the components represented. Included in the description is a lest of maintenance options possible for each component. This might include special test or calibration procedures, or replace and repair procedures. The analysis of the highest ranked components in the ambiguity group leads to the structural model 366 and yields one or more of these maintenance options. FIG. 7 illustrates two maintenance options 374 and 376 being output as a result of the analysis.

Figure 8:
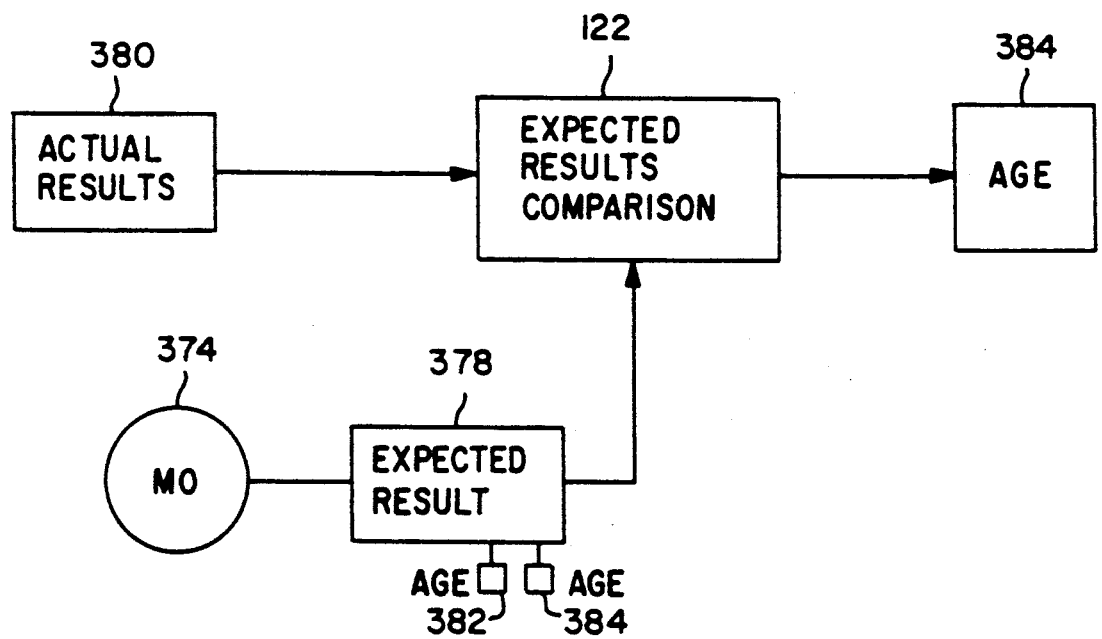
FIG. 8 illustrates the comparison of the actual results of a test performed on a system under test to the expected results.

Associated with each maintenance option is an expected result. FIG. 8 illustrates expected result 378 being associated with maintenance option 374. As before mentioned in describing step 122, the actual result 380 obtained in performing the maintenance option 374 can be compared to the expected results 378. Each expected result 378 is associated with two sets of ambiguity group effects 382 and 384, a first set 382 for use if the expected results 387 are confirmed by the actual results 380 and a second set 384, a first set 382 for use if the expected results 378 are not confirmed. The sets of ambiguity group effects 382 and 384, as before, specify components which should be re-ranked in the ambiguity group according to an associated ranking effect in step 106. FIG. 8, for example, illustrates the case where the expected results 378 are confirmed by the actual results 380, so that the first set of ambiguity group effects 382 is selected to be an output 382 from step 124. The step 122 can be repeated every time a maintenance option is performed.

Figure 9:
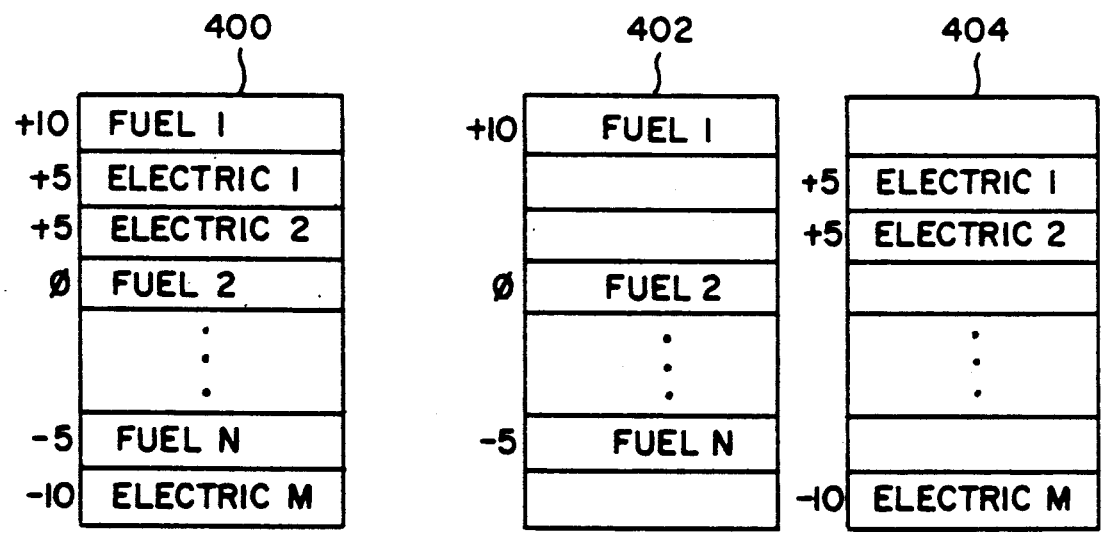
FIG. 9 illustrates the grouping of related components in the ambiguity group prior to the analysis of the structural model.

As a further step, once the ranking of components in the ambiguity group 364 is complete, but before the analysis of the structural model 366 in step 118, the components in the ambiguity group 364 can be grouped according to functional or structural relationships. In this way a logical progression of diagnosis through the system can proceed, so that the maintenance options which are output in step 112 do not suggest the testing of unrelated components. This is further illustrated in FIG. 9, wherein ambiguity group 400 contains a plurality of components from the fuel sub-system of the system under test and a plurality of components from the electrical sub-system of the system under test, all having a variety of ranks. According to this step, which is performed after the step 106 but before step 118, the components which are functionally related to the fuel sub-systems are selected to form a first group 402 while the components which are functionally related to the electrical sub-system are selected to form a second group 404. The analysis of the structural model 366 in step 118 can then proceed using one of the functionally related ambiguity groups 402 or 404. One sub-system at a time can be, therefore, completely tested.

The invention is not limited to the use of the models and representations discussed. Other models, representations or factors which characterize the system can be used by assigning a set of ambiguity group effects to each result obtained from the use of the alternative model, representation or factor. In this way, the most accurate characterizations can be used to obtain the optimum diagnostic result. The assigned sets of ambiguity group effects can then be applied to the ambiguity group 364 in step 106. By way of example only, results obtained from the use of reliability statistics, Failure Modes and Effects analysis (FMEA) and maintenance histories can be used in this manner.

Furthermore, the invention does not require the use of all of the steps and all of the system representations or model previously enumerated. If any of the representations or models of the system under test are of low quality or if any step yields consistently poor results they occur more frequently in the case of heuristic rule based knowledge representations, wherein an adequate set of rules is often difficult to develop.

Figure 10:
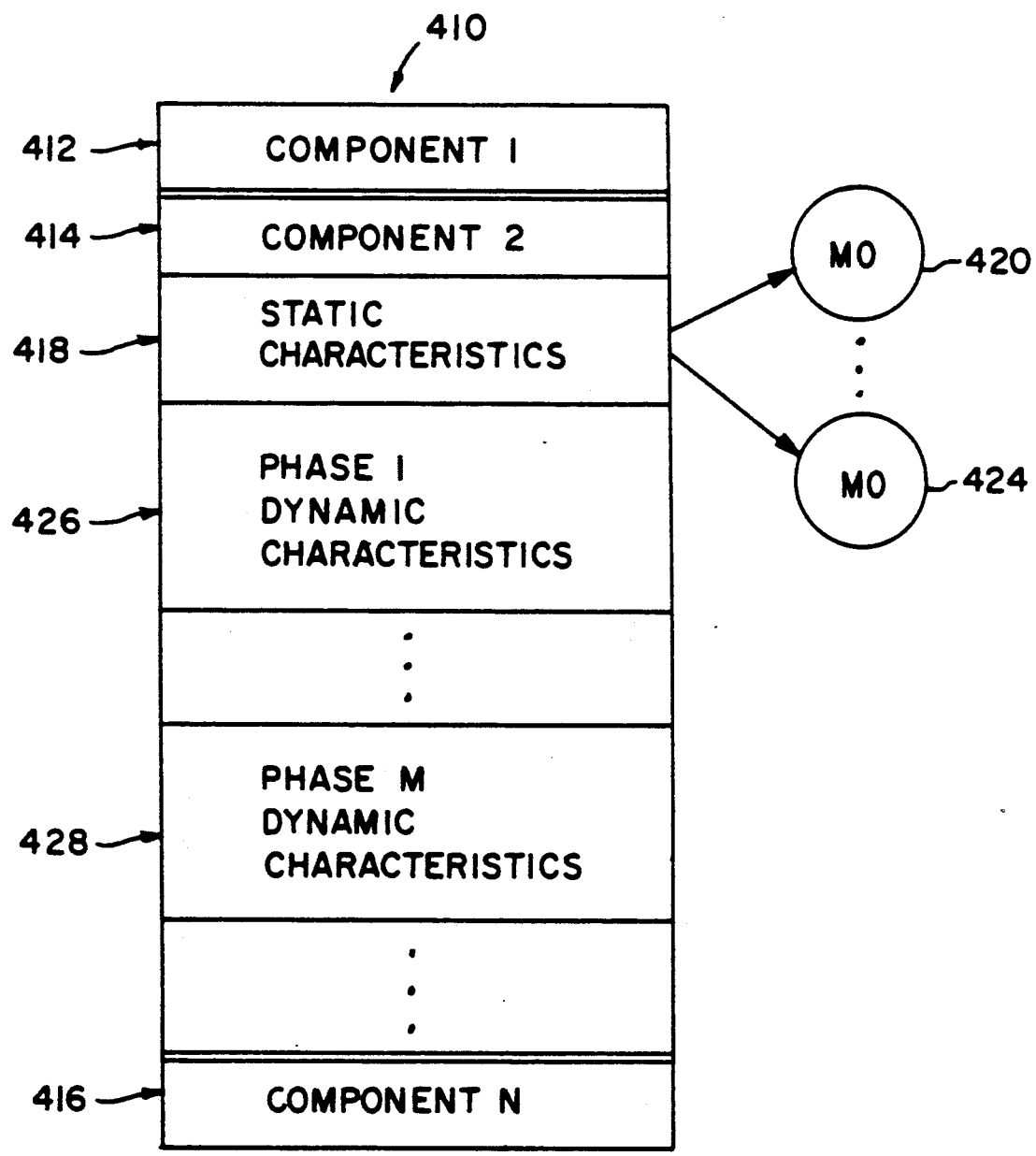
FIG. 10 shows an Event Structured Component Model.

In the event that the previously described steps do not diagnose the fault in this system under test, the analysis may be further expanded in accordance with an alternate embodiment of the present invention. Referring to FIG. 10, and Event Structured Component Model 410 is illustrated. This model 410 is an expansion of the structural model 366 described and to other known structural models.

The model 410 comprises a description of plurality of components 412, 414 and 416. The model 410 includes static characteristics at location 418 for each component 412 to 416 as does the structured model 366. The static characteristics 418 describe the component repair profile, in particular the testability and accessibility of the component. The maintenance options 420 through 424 which are output in step 120 of the preferred embodiment are also included here. These characteristics 416 can be used by a system technician to determine what to do next. Further tests on the component can be performed if the model in 410 indicates that the component. The maintenance options 420 through 424 which are output in step 120 of the preferred embodiment are also included here. These characteristics 416 can be used by a system technician to determine what performed if the model in 410 indicates the component is accessible to the technician. These static characteristics 416 are accessed via the ambiguity group pointers in the preferred embodiment of the invention. These static characteristics 416 can be substituted along with a static connectivity representation to construct the structural model 366.

The Event Structured Component Model 410 is differentiated from the structural model 366 by the inclusion of dynamic characteristics of each component at locations 426 through 428. The dynamic characteristics at a particular location characterize the components connectivity, hierarchy, performance characteristics and function at a given phase or event within the system under test. The connectivity of the component is characterized by specifying the inputs and outputs to the component and the connective medium. The hierarchy of the component describes super and subcomponents of the component. In other words, the hierarchy of the component describes whether the component is part of another group of components or consists of a group of components. The performance characteristics of the component are also included in its dynamic characteristics.

To use the Event Structured Component Model 410, the operational history of the APU contained in the state vector developed in step 102 is analyzed to determine the phase of failure of the system. By knowing the normal sequence of events in the operation of the system under test, and by comparing it to the recognized events, the phase of failure of the system under test can be determined. The Event Structured Component Model 410 can than be accessed by component according to the ambiguity group as previously described. The component in the model 410 is further referenced by the determined phase of failure. So, for example, if component 2 at location 414 is determined by analysis of the ambiguity group to be the most suspect component, that component in model 410 is referenced. If the failure of the system is determined to have occurred in phase 1 by analysis of the state vector obtained in step 102, then the dynamic characteristics of phase 1 of the second component at location 422 are accessed. These dynamic characteristics are used to recreate what the system should look like as compared to the actual operational characteristics are used to recreate what the system should look like as compared to the actual operational characteristics of the system.

This procedure can be used to suggest further components to be analyzed through the Event Structured Component Model 410. This search, however, must be limited to prevent computational problems. It may be limited by data derived during event recognition, by functional and structural connections, by connectivity paths or by components having a low ranking in the ambiguity group.

The diagnostic tool of the present invention is applicable to a variety of systems. The diagnostic tool comprises a hybrid knowledge representation and a series of analytical steps as described herein to sue the hybrid knowledge representation. In applying the diagnostic tool, the analytical steps are system independent, so that any of the steps described herein can be used for any system. The knowledge representations, however, are system dependent and must be modified to represent the system desired to be analyzed.

An example of the diagnostic tool as applied to an Auxiliary Power Unit (APU) for an airplane is now given. The application of the diagnostic tool to an APU is also described in "APU Maid: An Event—Based Model For Diagnosis", published Nov. 3, 1987 at the AUTOTESTCON meeting, which is incorporated herein by reference. Auxiliary Power Units are gas turbine engines used for aircraft ground base support for pneumatic power and generator support and in the air for both supplemental and emergency power support. The APU can either be used from a ground cart or installed in the aircraft as part of the pneumatic system. The APU's engine is comprised of a compressor/turbine section, with attaching components that make up the units fuel, bleed air, lubrication and electrical systems.

Table 1 illustrates a single data sample having label DS200 which is collected during the operation of the APU. The data sample provides six channels of analog data, including the time of the data sample, the oil pressure, the compressor discharge pressure, the fuel pressure, the exhaust gas temperature and the engine rpm. It also provides 16 channels of digital data as indicated.

TABLE 1

DATA SAMPLE DS200

| ANALOG CHANNEL | PARAMETER | VALUE | UNIT |
|---|---|---|---|
| 0 | TIME | 2 | SEC |
| 1 | P oil | 2.1 | PSI |
| 2 | Pcompressor discharge | 0 | PSI |
| 3 | P fuel | 40.0 | PSI |
| 4 | EGT (exhaust gas temperature) | 100.0 | F |
| 5 | % RPM (100% = 39,000 RPM OVERSPEED = 44,000 RPM) | 11 | % RPM |

| DIGITAL CHANNEL | PARAMETER | DISCRETE VALUE |
|---|---|---|
| 0 | CENTRIFUGAL SWITCH (static test REDUN 8) | 1 |
| 1 | START RELAY/START MOTOR (static test REDUN 9) | 1 |
| 2 | OIL P. DOOR CONTROL (NC) | 1 |
| 3 | RUN SWITCH TO FHR | 1 |
| 4 | COMPRESSOR DISCHARGE SOLENOID/LOAD CONTROL VALVE (static test/REDUN 10) | 0 |
| 5 | 95% CENT/ON SPEED RELAY (NO) | 0 |
| 6 | OVERSPEED TEST/STOP | 1 |
| 7 | FUEL HOLDING RELAY | 1 |
| 8 | START SW | 1 |
| 9 | APU START RELAY | 1 |
| 10 | BLEED AIR VALVE | 0 |
| 11 | APU FUEL RELAY CONTROL (static test REDUN 7) | 0 |
| 12 | OIL P. SEQ S (static test/REDUN 14) | 1 |
| 13 | OIL P. SEQ SW (no) (static test REDUN 14) | 0 |
| 14 | IGN UNIT | 0 |

Table 2 comprises a subset of event records from an event based representation of the APU. Four event records which define the start of the APU, the start of combustion within the APU, the reaction to the combustion and the actual combustion are shown.

TABLE 2

PARTIAL APU EVENT BASED REPRESENTATION

EV11 - START EVENT
(1) STATE VECTOR DEPENDENCIES
(2) CRITICAL PARAMETER "START -SW" = 1
(3) AFFECTED PARAMETERS
"ASR" = 1
"APU-START RELAY" = 1
"APU-START MOTOR" = 1
"OVERSPEED-TEST-SOLENOID" = 1
"FHR" = 1
(4) STATE VECTOR EFFECTS & AMBIGUITY GROUP EFFECTS (AGE)
EVI - 1
START-SW = 1; AGE − 10
= 0; AGE + 10
ASR = 1; AGE − 10
= 0; AGE + 10
APU-START RELAY = 1; AGE − 10
= 0; AGE + 10
APU-START MOTOR = 1; AGE − 10
= 0; AGE + 10
OVERSPEED-TEST-SOLENOID = 1; AGE − 10
= 0; AGE + 10
FHR = 1; AGE − 10
= 0; AGE + 10

EV2 - COMBUSTION-START EVENT
(1) STATE VECTOR DEPENDENCIES
START-EVENT - 1
(2) CRITICAL PARAMETERS
P-OIL = 2 − 3.5 PSI
% RPM = GT 0
(3) AFFECTED PARAMETERS
OIL-P-SEQ-SW = 1
IGNITION-UNIT = 1

TABLE 2-continued

PARTIAL APU EVENT BASED REPRESENTATION

TIME = LT 7 SEC
(4) STATE VECTOR EFFECTS
EV2-1
OIL-P-SEQ-SW = 1; AGE − 10
= 0; AGE + 10

EV3 - COMBUSTION-REACT EVENT
(1) STATE VECTOR DEPENDENCIES
COMBUSTION-START EVENT - 1
(2) CRITICAL PARAMETERS
P-FUEL - GT 0 PSI
(3) AFFECTED PARAMETERS
P-FUEL = 40 PSI
FUEL CONTROL VALVE SOL = 1
(4) STATE VECTOR EFFECTS
EV3 - 1
FUEL CONTROL VALVE SOLENOID AND P FUEL
= 1; FUEL CONTROL VALVE SOL, − AGE − 10
= 0; FUEL CONTROL VALVE SOL, AGE + 10

EV4 - COMBUSTION EVENT
(1) STATE VECTOR DEPENDENCIES
COMBUSTION-REACT EVENT = 1
(2) CRITICAL PARAMETER
"EGT" GT 400 F
(3) STATE VECTOR EFFECTS
EV4 = 1
IGNITION-UNIT = 1; AGE − 10
= 0; AGE + 10

Assume that Events 1 and 2 have been recognized by having their critical parameters matched by data samples prior to DS200. As a result of events 1 and 2 being recognized the state vector effects from those events have been added to the state vector, as illustrated in Table 3.

The event recognition process of step 102 for event 3 is now described. Assume that the data samples prior to DS200 have already been compared to event 3. Data sample DS200 is now compared. The first step is to check the state vector dependencies, which specify preconditions for the event to have occurred, against the state vector, which is a history of recognized events.

TABLE 3
STATE VECTOR

EV1 = 1
START-SW = 1
ASR = 1
APU-START RELAY = 1
APU-START MOTOR = 1
OVERSPEED-TEST-SOLENOID = 1
EV2 = 1
OIL-P-SEQ-SW = 1
EV3 = 1
FUEL-CONTROL-VALVE-SOL = 1

The state vector dependency for Event 3, as indicated by Table 1, is that event 2 (Combustion Start Event = 1) occurred. Checking the state vector in Table 3, event 2 is listed as having occurred (EV2 = 1) so event recognition can continue. The critical parameters of Event 3, fuel pressure greater than 0 PSI (P fuel GT O PSI), is compared to data sample DS200 next. Analog channel 3 of DS200 indicates that fuel pressure is 40 PSI, greater than O. Event 3 is, therefore, recognized.

Event 4 is now checked. The precondition for its being recognized, event 3, is in the state vector, so that analysis of the data sample DS200 can now occur. The critical parameter for this event is that the exhaust gas temperature be greater than 400 F. Checking the data sample DS200 on analog channel number 4 it is seen that the temperature is only 100 F. This event, therefore, is not recognized. Assume no other data sample serves to recognized Event 4.

The recognized events as well as any events which were not recognized but are related to the recognized events are now analyzed to determine which ambiguity group effects to use. Referring to event 1 in Table 2, six components which are directly related to the critical parameter and the affected parameters, are listed. The appropriate ranking effect, in this case, is determined by referencing the data sample DS200 to confirm the state of the affected parameters defined in the state vector effect. Considering the first effected parameter pointed to by the state vector effect of event 1, the state of the start switch is already known since that was the critical parameter, the state of the APU start relay, digital channel number 9 of DS200 shows a discrete value of 1. This compares to the state of the affected parameter as listed in event 1, confirming the state vector effect so then the ambiguity group effect that assigns a ranking of −10 to ASR is selected. In a similar fashion, it is seen that the ambiguity group effect that assigns a ranking of −10 to ASR is selected. In a similar fashion, it is seen that the ambiguity group effects selected from event 1 should assign a ranking of −10 to the remaining components as well as to the components specified in the state vector effects of event 2.

Event 3 has a state vector effect defined by the logical combination of the state of the fuel control valve solenoid and fuel pressure being greater than 40 PSI. To confirm this state vector effect, therefore, both of these affected parameters must be confirmed by data sample DS200. Referring to analog channel 3, the fuel pressure is 40 PSI, confirming that affected parameter. Referring to digital channel 15, the fuel control valve solenoid activated (=1), confirming that affected parameter. Since the logical combination of affected parameters is satisfied, the state vector effect is confirmed. The associated ambiguity group effect absolving the fuel control valve solenoid with a ranking effect of −10 is selected.

Event 4 was not recognized during the event recognition step, however, it is clearly related to events 1, 2 and 3. That event is, therefore, also analyzed to determine an appropriate ambiguity group effect. The state vector effect is directly related to the ignition unit. Referring to DS200 in Table 1 it is seen that the ignition unit has a discrete value of 0. The associated ambiguity group that assigns a ranking effect of +10 is, therefore, selected for use.

Table 4, illustrates symptom/fault relationships which exist in a symptom/fault model of the APU. The APU operation is observed and data is entered based on that observation. If we assume that the observed data specifies that the starter is cranking the engine but combustion is not occurring, then the symptom/fault relationship labeled SF10 is selected. The ambiguity group effect associated with SF10 is output for use. The ambiguity group effect specifies a list of components which are suspect in a ranking effect which is associated with each component.

Table 5 illustrates a failure model which comprises two event patterns. The first event pattern is defined by three event criteria, EC1, EC2 and EC3, which must all occur event pattern 1 to be recognized. Event criteria 1 is further defined as the logical combination of event record 3 and not event record 4. Event criteria 2 is defined as the pattern recognition record which results from SF10 being recognized record which results from a special test which is performed on the accelerator limiter. Associated with the first event pattern is an ambiguity effect which specifies the acceleration limiter as a suspect component and a ranking effect of +10. The second event pattern is also defined by the three event criteria of above. Event criteria 1 and event criteria 2 are the same as above, however, event criteria 3 is a pattern recognition record which results from special test which is performed on the ignition unit. The ambiguity effect associated with the second event pattern specifies that the ignition unit is suspect and assigns a ranking effect of +10. There are many more event patterns in an APU failure model, however, only two are shown here.

If we assume that the results of the special test performed on the accelerator limiter is negative then event pattern 1 is not recognized. On the other hand if we assume that the results of the special test performed on the ignition unit is positive, then event pattern 2 is recognized and the associated ambiguity group effect, which specifies the ignition unit as a suspect component and a ranking effect of +10 is output.

TABLE 4
SYMPTOM/FAULT RECORDS

SF1
PHASE 0
TEXT - "No response from starter when start switch is actuated"
AGE - +10
AG - BATTERY/EXTERNAL-POWER
 AIR-INTAKE-DOOR
 FUSES
 CENTRIFUGAL SWITCH
 APU-START-RELAY
 ASR

TABLE 4-continued
SYMPTOM/FAULT RECORDS

```
           STARTER-MOTOR
           STARTER-SWITCH
SF2
PHASE 0
TEXT - "Starter rotates only while start switch is
depressed"
AGE - +10
AG - ASR
      FHR
      WIRING
      BATTERY/EXTERNAL-POWER
SF10 (selected)
PHASE 1
TEXT - "Starter cranks engine but combustion does not
occur"
AGE - +10
AG - FUEL-SUPPLY
      WING-TANK-FUEL-VALVE
      FUEL PUMP
      ACCELERATION-LIMITER
      FUEL-CONTROL-VALVE-SOLENOID
      IGNITION-UNIT
      OIL-P-SEQ-SWITCH
      OIL-SUPPLY
      OIL-PUMP
      OIL-FILTER
      TURBINE-ASSEMBLY
```

TABLE 5
FAILURE MODEL

```
EP1 = EC1 AND EC2 ANY 3C3
EC1 - ER3 AND NOT ER 4
EC2 - PR(S/F10)
EC3 - PR (special test Acceleration-limiter — 3)
AGE - ACCELERATION LIMITER, +10
EP2 = EC1 AND EC2 AND EC3
EC1 - ER3 AND NOT ER 4
EC2 - PR(S/F10)
EC3 - PR (special test IGNITION-UNIT — 4)
AGE
IGNITION-UNIT, +10
```

If we collect all of the ambiguity group effects from each recognized and analyzed event record, from each recognized symptom/fault relationship and from each recognized event pattern from the failure model and apply the ranking effects, the ambiguity group as shown in Table 6 results. The elements ranked at −10 were all specified once by any of the event records. The oil pressure sequence switch which is ranked at 0 was specified as not being suspect as the result of event 2 being recognized, however, was suspected because of the recognition of the symptom-fault relationship labeled SF10. The fuel control valve solenoid was ranked at 0 because it was suspected with a ranking effect of +10 as a result of the symptom-fault relationship, SF10, and it was absolved from suspicion with a ranking effect of −10 as a result of the analysis of Event 3. The combined ranking effect of +10 resulted from the recognition of the symptom/fault relationship, SF10, from the symptom/fault model. The component ranked +20 was specified as being suspect as a result of the analysis of event 4 and as result of the recognition of event pattern 2 from the vary model.

TABLE 6
AMBIGUITY GROUP

AMBIGUITY GROUP RANKING (ALL COMPONENTS ARE RANKED: THE AGE AFFECT THE RANKING)
+20 IGNITION-UNIT (IMPLICATED BY BOTH EVENT

TABLE 6-continued
AMBIGUITY GROUP

```
    RECOGNITION AND THE SYMPTOM)
+10 fuel supply
    wing-tank-fuel-valve
    fuel-pump
    acceleration-limiter
    oil-supply
    oil-pump
    oil-filter
    turbine-assembly
  0 OIL-P-SEQ-SWITCH
    FUEL-CONTROL-VALVE-SOLENOID
-10 START-SW
    ASR
    START RELAY
    START MOTOR
    OVERSPEED TEST SOLENOIDS
    FHR
    OIL-P-SEQ-SW
    FUEL CONTROL VALVE
```

Each component in the ambiguity group ranking is further associated with a pointer, which is not shown. This pointer is used to select the associated location of the component in the structural model of the APU. The structural model is then analyzed and maintenance options for the APU are output.

The use of an event based representation to accomplish system performance monitoring and optimization in accordance with a preferred embodiment of the present invention will now be discussed with reference to FIG. 11. In the first step 500, operational data from sensors in the system being monitored is acquired by data acquisition circuitry during a period of operation of the system in much the same way as the data was acquired for fault diagnosis. It is preferable to use data acquisition circuitry having programmable parameters to allow for flexibility in the collection of the performance data. The following parameters, by way of example only, should be programmable; the enabling of the acquisition channels through which data is collected, the rate at which the data is sampled and the window of time over which the data is collected by the acquisition circuitry. Dynamically re-adjusting these and any other parameters provided by the acquisition circuitry according to the monitored performance of a system will yield collected data which is more pertinent to an aspect of the system performance which the monitoring system indicates needs further analysis. Such a flexible data acquisition system will, therefore, yield data of improved quality as well as a greater quantity of relevant data.

Further, the data acquisition circuitry should include sufficient memory to store enough performance data and enough processing capability to control the acquisition and storage. The before-mentioned intelligent data acquisition module, product number AVME-9110, manufactured by Acromag, has programmable acquisition parameters and a Motorola 68000 microprocessor for controlling data acquisition, data storage and bus communications as well as a range of other functions. A memory enhancement to the module, which can be made by one skilled in the art of electronic design, provides 128 kbytes of programmable read only memory and 128 kbytes of random access memory, which is sufficient for many mechanical and electromechanical applications having system frequencies under 10 Hz. Monitoring faster electromechanical systems or fast electrical systems with the present invention requires more memory and greater processing capabilities.

In the second step 502, event recognition is performed by comparing the data acquired in step 500 to an event based representation which models the performance of the system being monitored. As in fault diagnostics, the event based representation used in system monitoring consists of an event record database which comprises a plurality of event records, each of which pre-defines an event that can occur during the operation of the system being monitored. By comparing acquired performance data to the performance data in the event record database, the occurrence of events during the operation of the system can be recognized.

Each of the event records in the database used in step 502 comprises critical parameters which define conditions which must occur during operation of the system for the event defined by the event record to have occurred. These conditions are defined in terms of performance data. The event records further comprise state vector dependencies which define any events or other conditions which must occur prior to occurrence of the event defined by the event record. These are similar to the critical parameters and the state vector dependencies in the event based representation 152 at locations 160 and 166, respectively, in FIG. 2. The other data in the event based representation 152 used for system diagnostics, the affected parameters and state vector effects, are not included in the representation used for monitoring.

Figure 12:
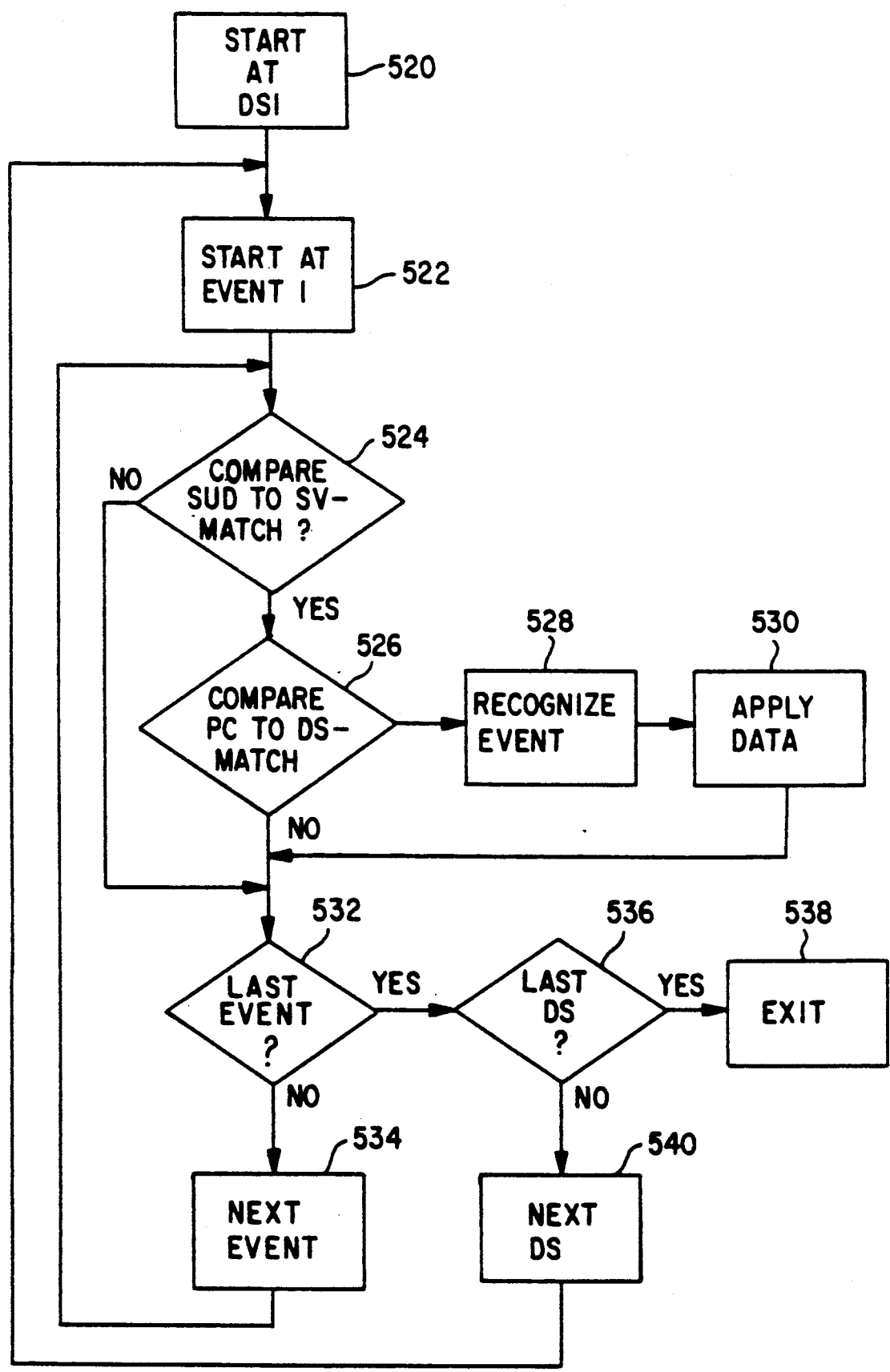
FIG. 12 illustrates the steps of event recognition used to perform system monitoring.

FIG. 12 illustrates a preferred method for performing the event recognition step 502 when monitoring a system's performance. In step 520, a first data sample from the data acquired during the step 500 is selected. In step 522, the first event record in the event record database is selected. In the next step 524, the state vector dependencies in the selected event record which define the preconditions that must exist in the system being monitored for the defined event to be recognized, are compared to a history of events that occurred during the operation of the system being monitored. This history is embodied in a state vector, as previously described. The state vector is updated every time an event is recognized. If the state vector dependencies are not found in the state vector, then the event based representation is checked in the step 532 to see if there are more event records.

If the comparison step 524 yields a match, between the state vector dependencies and the state vector, then the event recognition analysis for the selected event record continues. In the step 526, the selected data sample from the acquired data is compared to the critical parameters found in the selected event record. If a match between the critical parameters and the data sample is found in step 526, then the event defined by the event record is declared recognized in the step 528 and the recognized event is added to the state vector, which is a list of recognized events. Then in the step 530, Intelligent Data Acquisition Actions (IDAAs), which are associated with each event record in the database are output retrieved from each event record representing recognized events and then executed.

If no match is found in the step 526, then in the step 532, the event based representation is examined to see if there are more event records. If there are, no more events, the acquired data is examined in the step 536 to see if the last data sample from collected data was used. If it was, then the analysis is ended in the step 538. If there are more data samples, then the next one is retrieved in the step 540 and the analysis resumes starting with step 522.

Steps similar to those illustrated in FIG. 12 can also be used in performing fault diagnostics on a system to accomplish the event recognition step 102 of FIG. 2. The only difference in the use of these steps for event recognition for fault diagnostics is found in the step 530. As previously discussed, the diagnostic event record database includes the state vector effects which are associated with each pre-defined event. When an event is recognized during fault diagnostics, step 530 would add the state vector effects to the state vector in the manner as previously discussed with respect FIG. 3. In event recognition for system monitoring the IDAAs are instead executed.

The steps of FIG. 12 can be modified to increase the speed of the monitoring function by only using those event records which can logically occur during the period of monitoring. In that case, before the step 534 is performed, the next event record is examined to see if it could have occurred during the sample window in which operational data was acquired. If it could not then the following event record is considered, and so on.

Referring back to FIG. 11, in step 504, the IDAAs are retrieved from each event record representing an event that was recognized in the step 502. Each of the IDAAs specify an operation or operations to be performed to direct data storage or enhance data acquisition.

In designing the IDAAs in the step 504, the analysis of the recognized events is done prior to event recognition. This allows the IDAAs to be performed as soon as an event is recognized, with a minimum delay so that the monitoring can be performed in real time.

In the step 506, the data acquired in the step 500 is stored once an event is recognized in the step 502. This data is stored for future analysis in the step 508. The data is buffered until a second event, which depends on the first recognized event, is recognized as normal. Operational data existing during abnormal or missing events is, therefore, stored. The data can be stored using any data compression and reduction techniques which allow for future reconstruction of a particular time slice of a signal. Different techniques, as appropriate, can be used for different signals as long as the above requirement is met. Such techniques are well known to those skilled in the art.

In the step 508, the events or the series of events which are recognized and the data stored in the step 506 are further analyzed by a computer or other processing element which can be made a part of the monitoring system. The analysis performed in the step 508 can be a more detailed analysis which supplements and improves upon the analysis embodied in the IDAAs. The performance of the step 508, however, is much slower than the performance of the step 504. Since the step 508 analyzes the acquired data in greater depth, the results can be used to modify the IDAAs so as to improve the results obtained in the step 504. This is done by simply accessing the model and modifying the IDAAs in accordance with the analysis of the step 508. Also, the results from the analysis step 508 can be used to modify system performance, data acquisition or the system model in the same way as the results from the step 504 can be used.

Figure 11:
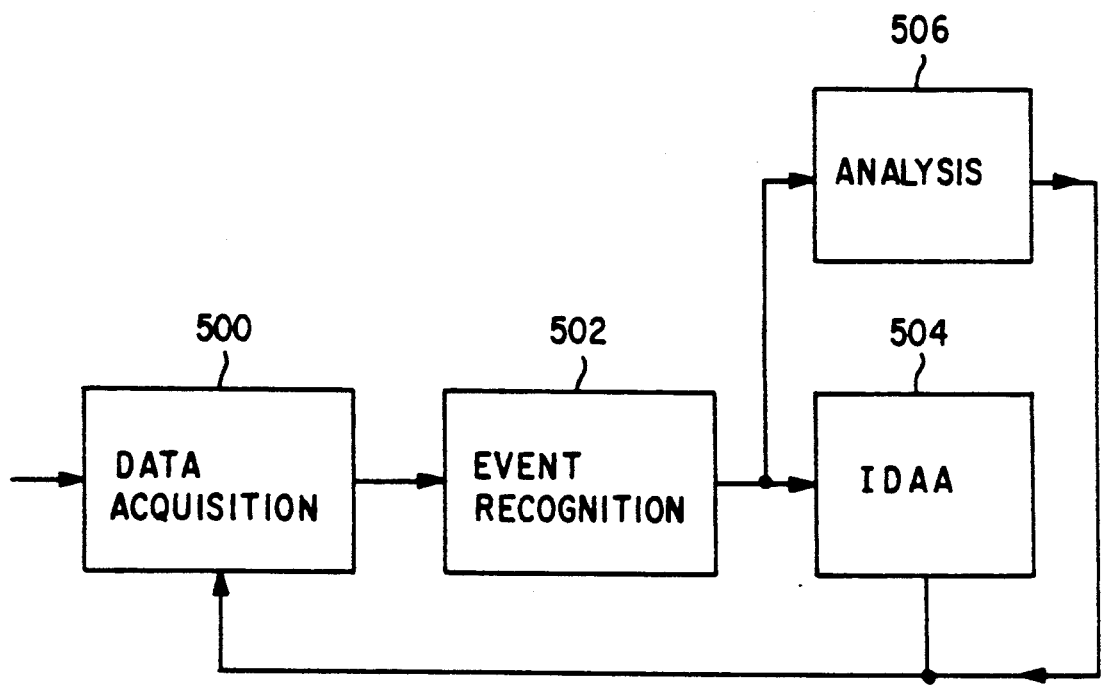
FIG. 11 illustrates the steps performed to monitor a systems performance in accordance with a preferred embodiment of the present invention.

The steps 500 to 508 illustrated in FIG. 11 can also be used to improve the results obtained when performing fault diagnosis. For example, if the fault diagnostic procedures result in two components being equally ranked in their likelihood of failure, then the data acquisition system can be modified in accordance with the results from the step 504 or from the step 508 to acquire additional data which is more specific to the performance of the two components having equal rankings. Analysis of the additional data can then yield the faulty component.

The results from the analysis step 508 can also be used to modify a performance parameter in the system being monitored to improve the system's performance. For example, if in an airplane, a low fuel condition were detected, then the performance of the environmental control system could be degraded to conserve fuel.

Also, if the analysis performed in the step 508 indicates that the system is performing abnormally, then a warning can be issued to warn an operator of the system of the abnormal behavior. For example, if the system being monitored has military applications, an analysis process performing battle damage assessment on the system can use the results of system monitoring to determine the functionality or its ability to accomplish its mission. An IDAA from step 504 can also issue such a warning, however, it can do so only in cases where such a determination can be made from the recognition of a single event.

Figure 13:
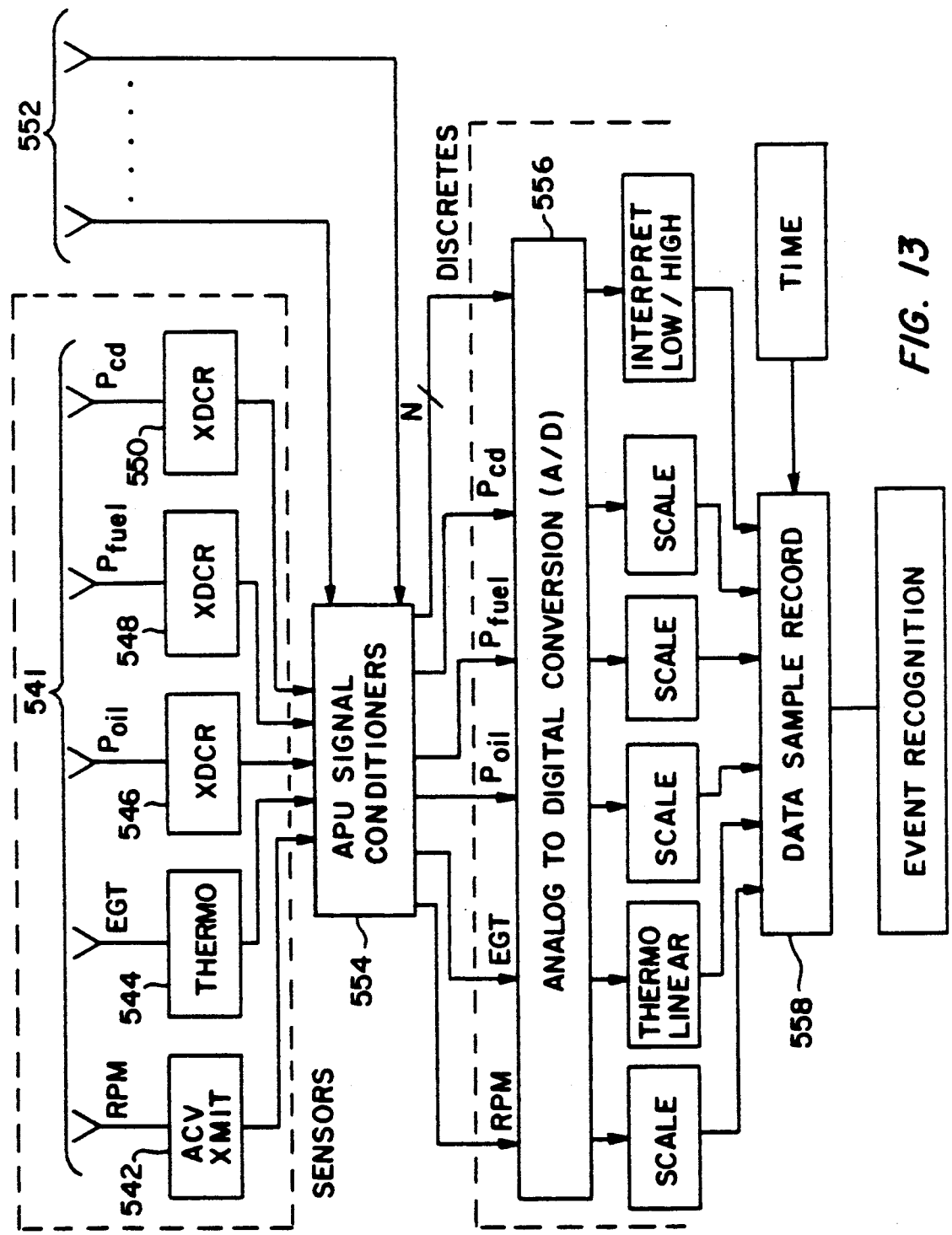
FIG. 13 illustrates a data acquisition system and a monitoring system connected to an Auxiliary Power Unit (APU)

As mentioned before, the data acquisition system should be flexible to allow the modification of parameters within the data acquisition system in response to the steps 504 or 508. This is illustrated with reference to FIGS. 13 through 16. FIG. 13 illustrates a data acquisition system and a monitoring system which are connected to an APU. The sensors 542, 544, 546, 548 and 550 are connected to the APU to detect the turbine RPM, the Exhaust Gas Temperature, the oil pressure, the fuel pressure and the compressor discharge pressure, respectively. A plurality of sensors 552 detect digital signals form various points in the APU. These sensors each output individual signals to a signal conditioner 554 which scales, linearizes, amplifies and translates each signal to an appropriate level. The signals are output to an analog to digital convertor 556. Whenever signals from the sensors 542 through 552 are acquired, a data sample record comprising each of the present signals is stored in a memory 558. Additionally, each data sample is time tagged in the memory 558. One of the advantages of this invention is that if any particular channel exhibits a problem, the data acquisition system can be tailored to acquire data more pertinent to the problem.

Figure 14:
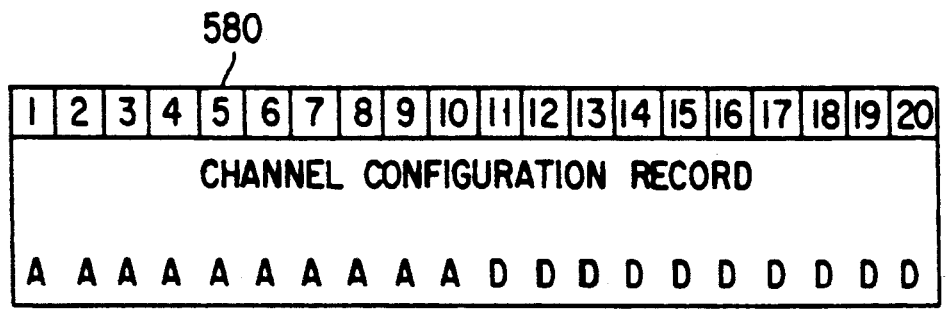
FIGS. 14 and 15 illustrate a reconfiguration of a data acquisition system as a result of the monitoring system recognizing an event.
Figure 14:
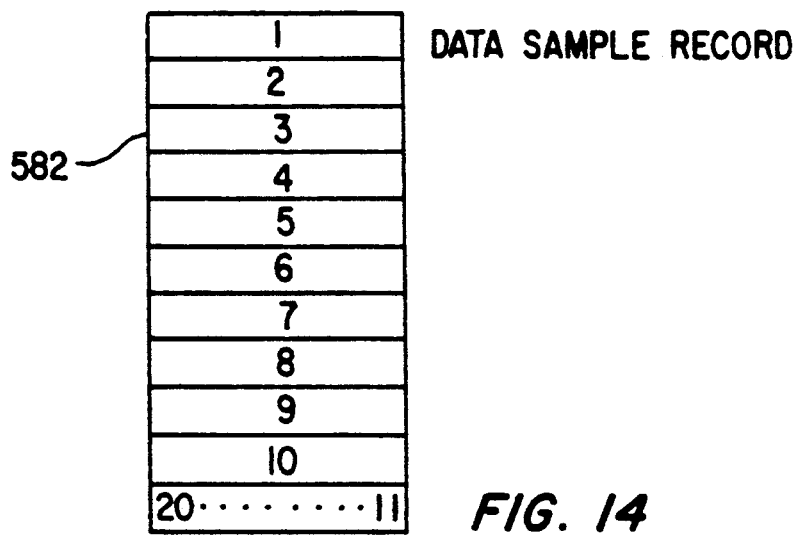
Figure 15:
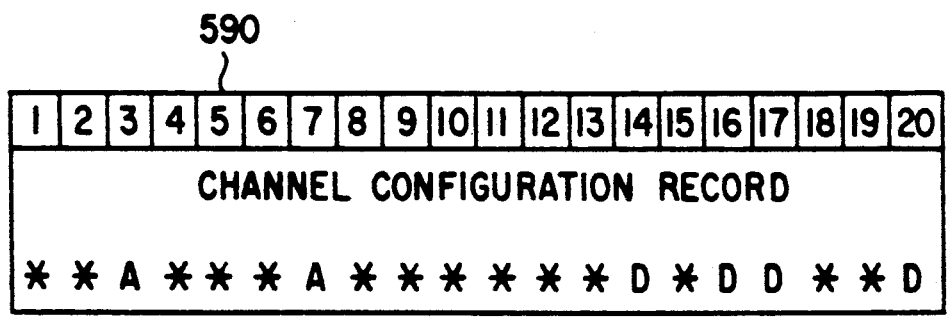
Figure 15:
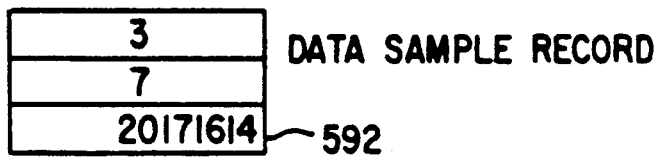

A first way in which IDAAs or the analysis from the step 508 can modify data acquisition is to reconfigure the acquisition channels. Referring to FIGS. 14 and 15, two potential channel configurations of a data acquisition system are illustrated, by way of example only, to show the effectiveness of the present invention in obtaining data of better quality. The illustrated data acquisition system has twenty channels, a given amount of memory, for example 1M byte or 8M bit, and uses a twelve bit analog to digital converter which is not shown. FIG. 14 illustrates a channel configuration 580, wherein channels one through ten are assigned to receive analog signals as indicated by the "A" below the respective channel number and channels eleven through twenty are assigned to receive digital signals as indicated by the "D" below the respective channel numbers. Such a configuration might be used to monitor the performance of a system during normal operation to acquire as broad a representation of the performance of the system as possible. The collection of data from the monitored system using this channel configuration 580 results in the data sample record 582. The data sample record 582 comprises 130 bits of data; twelve bits from each of the ten analog channels upon their conversion to a digital signal by the twelve bit analog to digital converter and one bit from each of the ten digital channels. As a result, when the monitoring system uses the channel configuration 580 of FIG. 14, 61538 sample records (18M bits/130 bits per sample record) can be stored in the memory of the data acquisition system.

There may be cases, however, where the particular channel configuration 580 does not provide sufficient data relating to an area of performance of the system which is of particular interest. If, for example, the events recognized by the event recognition step 502 (see FIG. 11) indicate that the data on channels 3, 7, 14, 16, 17 and 20 are of particular interest, then according to the invention the channel configuration 580 is modified accordingly. FIG. 15 illustrates the modified channel configuration 580, where only channels 3 and 7 are enabled to collect analog signals and only channels 14, 16, 17 and 30 are enabled to collect digital signals.

The advantage of collecting data using the modified channel configuration 590 can be seen by referring to the resulting data sample 592, which comprises 28 bits; twelve bits from each of the two analog channels and one bit from each of the four digital channels. As a result, when the monitoring system uses the channel configuration 590 of FIG. 15, 285,714 sample records (8M bits/28 bits per sample record) can be stored in the memory of the data acquisition system.

The use of the channel configuration 590 of FIG. 15, therefore, allows approximately 4.6 times the number of sample records to be stored as the use of the channel configuration 580 does. Furthermore, all of the data stored is related to the aspect of performance of the system which is of particular interest, whereas the data sample 582 resulting from the use of the channel configuration 580 of FIG. 14 would result in a large amount of extraneous data which is not related to the area of performance of particular interest. The amount of relevant data stored is, therefore, much greater than 4.6 times. Given the limited amount of memory which can be provided in a given space, this flexibility in channel configuration results in a monitoring system with greatly improved data acquisition, both in terms of quality and quantity of data stored.

Figure 16:
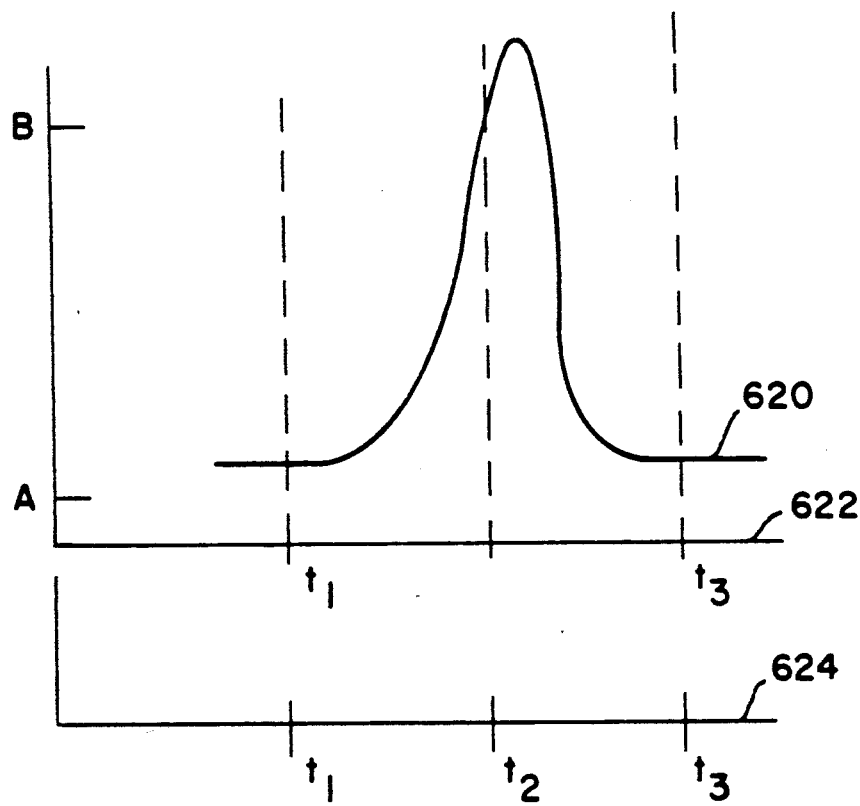
FIG. 16 illustrates a signal being sampled by the data acquisition system of the present invention.

In addition to the channel configuration, the sampling rate at which the data acquisition system samples the signals in a system can be adjusted to examine a particular aspect of the data. FIG. 16 illustrates a signal 620 which is sampled on a particular channel. A first time line 622 illustrates the initial sampling rate of the data acquisition system, wherein samples of the signal are taken at times $t_1$ and $t_3$ and a voltage Level A is obtained each time. If the voltage Level A is a normal level, the sampling rate associated with time line 622 would not indicate the problem. If, however, the events recognized during the event recognition step 502 indicate that the problem may lie in this signal, then the sampling rate can be increased to obtain a more detailed picture of the signal and to examine any transient responses in the signal. For example, if the sample rate is doubled as indicated on time line 624, so that the signal 620 is now sampled at times $t_1$, $t_2$ and $t_3$, then the sample taken at time $t_2$ would indicate an abnormal voltage Level B which was undetected previously. Alternately, if the signal of concern needs to be sampled over a greater time window, the sampling rate of the system can be decreased.

Another way in which the data acquisition can be modified is by the window time over which the data acquisition circuitry acquires data. If a certain time of operation of the system is deemed to be of particular importance by virtue of an event being recognized, then the associated IDAA may specify a start condition as well as a stop condition for enabling data acquisition so as to specify the period of sampling. In this way, a greater quantity of data from the relevant period of operation can be collected.

Figure 17:
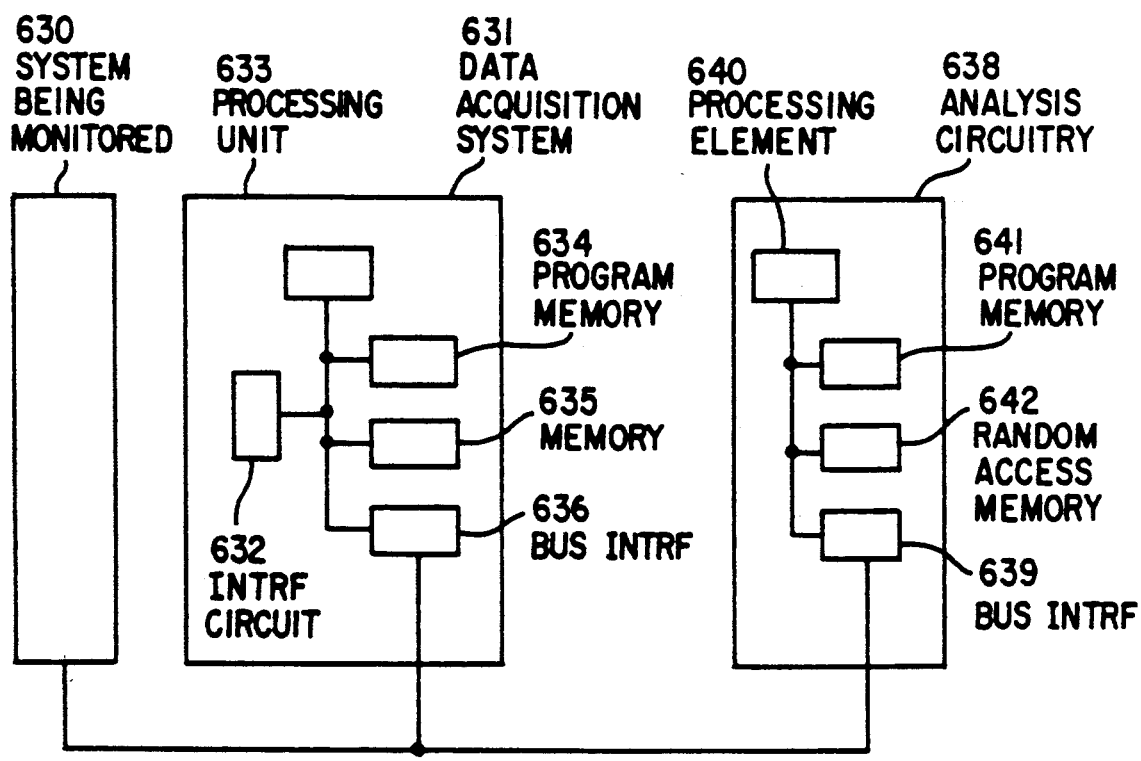
FIG. 17 is a block diagram of the circuitry in the monitoring system.

FIG. 17 shows the circuitry used for the monitoring system in accordance with the preferred embodiment of the present invention. The system 630 being monitored is connected to the data acquisition system 631 through the interface circuitry 632. The interface circuitry 632, in a preferred embodiment, is illustrated in FIG. 13. The data acquisition system 631, as mentioned before, includes a processing unit 633, program memory 634 and random access memory 635. The processing element 633 controls the acquisition of data through the interface circuitry 632, the storage of the acquired data in the memory 635 as well as the bus interface 636. The database having the model of the system 630 can be stored in program memory 634 or, alternatively, it can be stored in the random access memory 635. Referring back to FIG. 11, the steps 500, 502 and 504 are performed within the data acquisition unit. The IDAAs are output through the bus interface unit 636 if the system 630 is to be modified. If the data acquisition or the system model is to be modified by an IDAA, then the modifications can be done internally within the data acquisition system 631.

If the steps 506 and 508 are to be performed, then additional memory and processing power and time is required. This is provided by the analysis circuitry 638. A bus interface 639 receives data from the data acquisition system 631 during the step 506. The processing element 640, which may be as powerful as space allows, is provided, along with its programmed memory 641 and the random access memory 642. The acquired data is stored in the memory 642 for analysis by the processing element 640. Further, the interface 643 has the compatibility to interface with the system 630 being monitored as well as the data acquisition unit 631 so as to effect the modification of the system 630, the data acquisition unit 631 or the model of the system.

Figure 18:
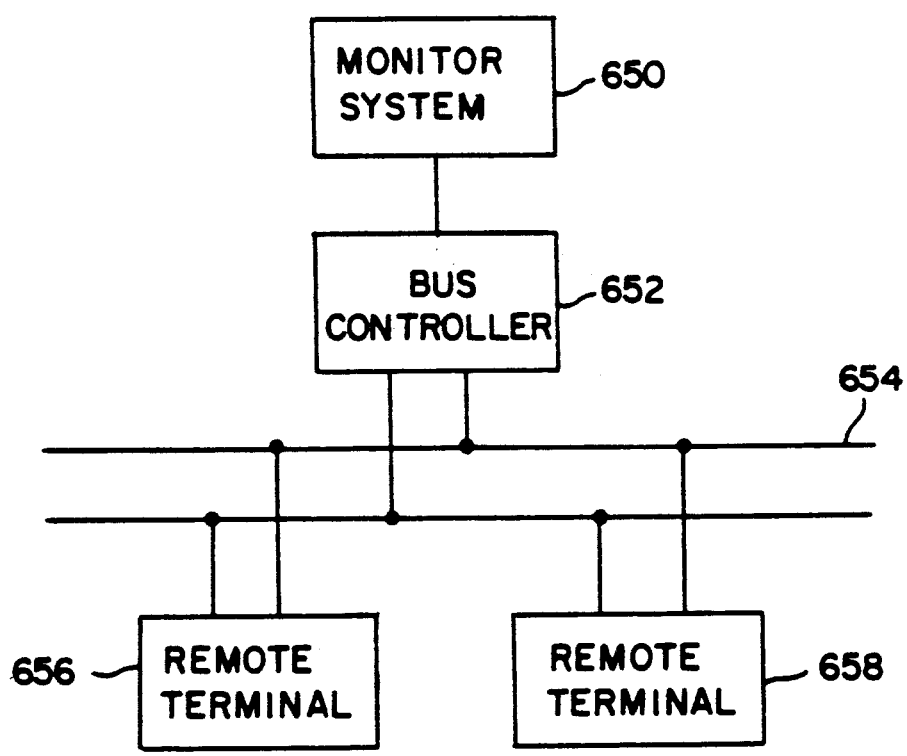
FIG. 18 illustrates the monitoring system of the present invention in communication with the bus controller of a MIL-STD-1553 bus to perform system monitoring.

FIG. 18 shows an alternate embodiment of the present invention, wherein the monitoring system 650 is connected to a bus controller 652 on a MIL-STD-1553 bus 654. The bus controller 652 communicates with a plurality of remote terminals 656 and 658 on the bus 654, issuing commands to each remote terminal 656 and 658 and receiving data in response to those commands. Each remote terminal 656 and 658 can be designed with onboard monitoring capabilities and with the ability to transmit the collected performance data to the bus controller 652 upon command. The bus controller 652 transmits the performance data from each remote terminal 656 and 658 to the monitoring system 650. The monitoring system 650 can then cause the bus controller 652 to issue a command to any of the remote terminals 656 and 658 instructing them to alter their onboard monitoring system to tailor the collection of data or the performance of the remote terminals 656 and 658 in any of the aforementioned ways.

We claim:

1. A method for monitoring a system's performance, comprising the steps of:
    (a) modeling the system's performance with a database having a plurality of event records, each of said plurality of event records pre-defining an event that can occur during operation of the system by those events on whose occurrence the occurrence of said pre-defined event is dependent and by one or more critical parameters defining operational data which must occur during the system's performance for said pre-defined event to occur;
    (b) acquiring a plurality of operational data samples from the system during a period of operation with a data acquisition system;
    (c) for a first of said plurality of event records, comparing said events on whose occurrence the occurrence of said pre-defined event is dependent to a list of prior recognized events, if said first of said plurality of event records is so pre-defined;
    (d) for said first of said plurality of event records, comparing a first of said plurality of said acquired operational data samples to said one or more critical parameters in said first of said plurality of event records, if a match is found in step (c) or if step (c) need not be performed;
    (e) recognizing said event pre-defined by said first of said event records as having occurred during operation of the system if a match is found between said first of said plurality of acquired operational data samples and said one or more critical parameters from said first of said plurality of event records and adding said recognized event to said list of recognized events;
    (f) repeating steps (d) and (e) for each successive acquired operational data sample in said plurality of acquired operational data samples unless said first of said plurality of event records is recognized in step (e);
    (g) repeating steps (c), (d), (e) and (f) for each successive event record in said plurality of event records; and
    (h) analyzing said recognized events to determine the system's performance.

2. The method as claimed in claim 1, further comprising the step of:
    (i) modifying a performance parameter in the system as a result of said analyzing step (h) to obtain a desired performance level of the system.

3. The method as claimed in claim 1, further comprising the step of:
    (i) modifying said data acquisition system to enable acquisition of a second plurality of operational data samples in accordance with the results of said analyzing step (h):

4. The method as claimed in claim 3, wherein said data acquisition system's channel configuration is modified.

5. The method as claimed in claim 3, wherein said data acquisition system's sampling rate is modified.

6. The method as claimed in claim 3, wherein said data acquisition system's sampling window specifying said period of operation is modified.

7. The method as claimed in claim 1, wherein said model of the system is modified in accordance with the results of said analyzing step (h).

8. The method as claimed in claim 1, further comprising the step of:
   (i) providing a warning to an operator of the system where said analyzing step (h) indicates an abnormal performance status for the system.

9. The method as claimed in claim 1, wherein said analysis step (h) is performed prior to said steps of data acquisition and event recognition and a result of said analysis step (h) specifying an action to be performed is associated with each of said plurality of event records, so that upon recognition of one of said pre-defined events said associated action can be performed.

10. The method as claimed in claim 9, wherein said steps of acquiring a plurality of operational data samples are performed in real time.

11. The method as claimed in claim 1, wherein only those event records from said plurality of event records which can logically occur during said period of operation in which said plurality of operational data samples are acquired are used in steps (c) and (d).

12. A method for monitoring a system's performance, comprising the steps of:
   (a) modeling the system's performance with a database having a plurality of event records, each of said plurality of event records pre-defining an event that can occur during operation of the system by those events on whose occurrence the occurrence of said pre-defined event is dependent and by one or more critical parameters defining operational data which must occur during the system's performance for said pre-defined event to occur, each of said plurality of event records further having a plurality of data defining actions to be performed;
   (b) acquiring a plurality of operational data samples from the system during a period of operation with a data acquisition system;
   (c) for a first of said plurality of event records, comparing said events on whose occurrence the occurrence of said pre-defined event is dependent to a list of prior recognized events, if said first of said plurality of event records is so pre-defined;
   (d) for said first of said plurality of event records, comparing a first of said plurality of said acquired operational data samples to said one or more critical parameters in said first of said plurality of event records if a match is found in step (c) or if step (c) need not be performed;
   (e) recognizing said event pre-defined by said first of said event records as having occurred during operation of the system if a match is found between said first of said plurality of acquired operational data samples and said one or more critical parameters from said first of said plurality of event records and adding said recognized event to said list of recognized events;
   (f) repeating steps (d) and (e) for each successive acquired operational data sample in said plurality of acquired operational data samples unless said first of said plurality of event records is recognized in step (e);
   (g) repeating steps (c), (d), (e) and (f) for each successive event record in said plurality of event records; and
   (h) for each of said events recognized in step (e), performing the associated action.

13. The method as claimed in claim 12, wherein said actions modify said data acquisition system to enable the acquisition of a second plurality of operational data samples.

14. The method as claimed in claim 13, wherein said data acquisition system's channel configuration is modified.

15. The method as claimed in claim 13, wherein said data acquisition system's sampling rate is modified.

16. The method as claimed in claim 13, wherein said data acquisition system's sampling window specifying said period of operation is modified.

17. The method as claimed in claim 12, wherein said actions provide a warning to an operator of the system where the system is operating abnormally.

18. The method as claimed in claim 12, wherein steps (b) through (h) are performed in real time.

19. The method as claimed in claim 12, wherein only those event records from said plurality of event records which can logically occur during said period of operation in which said plurality of operational data samples are acquired are used in steps (c) and (d).

20. The method as claimed in claim 12, further comprising the steps of:
   (i) storing said acquired data once one of said pre-defined events is recognized; and
   (j) analyzing said recognized events and said stored data to determine the system's performance.

21. The method as claimed in claim 20, further comprising the step of:
   (k) modifying said storing step (i) in accordance with an action from said step (h).

22. The method as claimed in claim 20, wherein said acquired data is stored using data compression and reduction techniques which allow for data reconstruction.

23. The method as claimed in claim 20, further comprising the step of:
   (i) modifying a performance parameter in the system as a result of said analyzing step (h) to obtain a desired performance level of the system.

24. The method as claimed in claim 20, further comprising the step of:
   (i) modifying said data acquisition system to enable acquisition of a second plurality of operational data samples in accordance with the results of said analyzing step (h):

25. The method as claimed in claim 20, wherein said model of the system is modified in accordance with the results of said analyzing step (h).

26. The method as claimed in claim 20, further comprising the step of:
   (i) providing a warning to an operator of the system where said analyzing step (h) indicates an abnormal performance status for the system.

27. Apparatus for monitoring a system's performance, comprising:
   data acquisition means for collecting a plurality of operational data samples from the system during a period of operation;
   an event record database for providing a plurality of event records, each of said plurality of event records pre-defining an event that can occur during operation of the system by those events on whose occurrence the occurrence of said pre-defined event is dependent and by one or more critical parameters defining operational data which must occur during the system's performance for said pre-defined event to occur, each of said plurality of event records further having a plurality of data defining actions to be performed;

event recognition means for accessing successive event records in said plurality of event records and for each of said plurality of event records, comparing said event on whose occurrence the occurrence of said event pre-defined by said event record is dependent and if a match is found, then comparing said one or more critical parameters to each successive operational data sample and if a match is found, recognizing said event pre-defined by said event record as having occurred;

means for accessing said event records which pre-define each of said recognized events and performing the specified action.

28. The apparatus as claimed in claim 27, further comprising:
modifying means for changing a performance parameter in accordance with said action.

29. The apparatus as claimed in claim 27, further comprising:
modifying means for adjusting one or more parameters in said data acquisition means in accordance with said action to enable acquisition of a second plurality of operational data samples.

30. The apparatus as claimed in claim 29, wherein said data acquisition system's channel configuration is modified.

31. The apparatus as claimed in claim 29, wherein said data acquisition system's sampling rate is modified.

32. The apparatus as claimed in claim 29, wherein said data acquisition system's sampling window specifying said period of operation is modified.

33. The apparatus as claimed in claim 27, further comprising:
memory means for storing said acquired data once one of said pre-defined events is recognized; and
analysis means for analyzing said recognized pre-defined events to determine the system's performance.

34. The apparatus as claimed in claim 27, further comprising:
indicator means for warning an operator of the system of abnormal performance in accordance with said action.

35. Apparatus for monitoring a system's performance, comprising:

data acquisition means for collecting a plurality of operational data samples from the system during a period of operation;

an event record database for providing a plurality of event records, each of said plurality of event records pre-defining an event that can occur during operation of the system by those events on whose occurrence the occurrence of said pre-defined event is dependent and by one or more critical parameters defining operational data which must occur during the system's performance for said pre-defined event to occur;

event recognition means for accessing successive event records in said plurality of event records and for each of said plurality of event records, comparing said event on whose occurrence the occurrence of said event pre-defined by said event record is dependent and if a match is found, then comparing said one or more critical parameters to each successive operational data sample and if a match is found, recognizing said event pre-defined by said event record as having occurred;

means for accessing said event records which pre-define each of said recognized events and performing the specified action.

36. The apparatus as claimed in claim 35, further comprising:
modifying means for changing a performance parameter in accordance with said an output from said analysis means.

37. The apparatus as claimed in claim 35, further comprising:
modifying means for adjusting one or more parameters in said data acquisition means in accordance with an output from said analysis means to enable acquisition of a second plurality of operational data samples.

38. The apparatus as claimed in claim 37, wherein said data acquisition system's channel configuration is modified.

39. The apparatus as claimed in claim 37, wherein said data acquisition system's sampling rate is modified.

40. The apparatus as claimed in claim 37, wherein said data acquisition system's sampling window specifying said period of operation is modified.

41. The apparatus as claimed in claim 35, further comprising:
indicator means for warning an operator of the system of abnormal performance in accordance with said analysis means.

* * * * *